United States Patent
Chen et al.

(10) Patent No.: US 12,277,321 B1
(45) Date of Patent: Apr. 15, 2025

(54) METHOD AND APPARATUS FOR SUPPORTING IOPS BURST, ELECTRONIC DEVICE, AND MEDIUM

(71) Applicant: SUZHOU METABRAIN INTELLIGENT TECHNOLOGY CO., LTD., Jiangsu (CN)

(72) Inventors: Donghe Chen, Jiangsu (CN); Peng Zhao, Jiangsu (CN); Ruipeng Feng, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/865,255

(22) PCT Filed: May 25, 2023

(86) PCT No.: PCT/CN2023/096159
§ 371 (c)(1),
(2) Date: Nov. 12, 2024

(87) PCT Pub. No.: WO2024/113716
PCT Pub. Date: Jun. 6, 2024

(30) Foreign Application Priority Data

Nov. 28, 2022 (CN) .......................... 202211498305.0

(51) Int. Cl.
*G06F 3/06* (2006.01)
(52) U.S. Cl.
CPC ............ *G06F 3/061* (2013.01); *G06F 3/0655* (2013.01); *G06F 3/0679* (2013.01)

(58) Field of Classification Search
CPC ....... G06F 3/061; G06F 3/0655; G06F 3/0679
(Continued)

(56) References Cited

U.S. PATENT DOCUMENTS 9,537,777 B1   1/2017  Tohmaz et al.
11,775,186 B1* 10/2023  Setter .................... G06F 3/0604
                                                         711/100
(Continued)

FOREIGN PATENT DOCUMENTS

CN    107276827 A    10/2017
CN    107959635 A    4/2018
(Continued)

*Primary Examiner* — Kenneth M Lo
*Assistant Examiner* — Jonah C Krieger
(74) *Attorney, Agent, or Firm* — IPro, PLLC

(57) ABSTRACT

The present disclosure provides a method for supporting an IOPS burst. The method includes: in response to an I/O read/write operation for each storage volume, recording a current I/O read/write time and an I/O quantity of the I/O read/write operation; calculating a time difference between the current I/O read/write time and a previous I/O read/write time, and updating a capacity of the storage volume primary bucket and a capacity of the storage volume burst rate bucket according to the time difference and a preset token inflow bucket rate; determining a state of I/O in the I/O read/write operation according to the I/O quantity and a size relationship among an updated capacity of the storage volume primary bucket, an updated capacity of the storage volume burst rate bucket and a capacity of the storage volume burst capacity bucket; and performing processing on the I/O according to the state of the I/O.

20 Claims, 5 Drawing Sheets

---

In response to an input/output (I/O) read/write operation for each of the storage volumes, a current I/O read/write time and an I/O quantity of the I/O read/write operation are recorded — 101

Time difference between the current I/O read/write time and a previous I/O read/write time is calculated, and a capacity of the storage volume primary bucket and a capacity of the storage volume burst rate bucket are updated according to the time difference and a preset token inflow bucket rate — 102

State of I/O in the I/O read/write operation is determined according to the I/O quantity and a size relationship among an updated capacity of the storage volume primary bucket, an updated capacity of the storage volume burst rate bucket and a capacity of the storage volume burst capacity bucket, wherein the state of the I/O is used to reflect a state of IOPS — 103

Corresponding processing is performed on the I/O according to the state of the I/O — 104

(58) Field of Classification Search
USPC .......................................................... 711/154
See application file for complete search history.

(56) References Cited

U.S. PATENT DOCUMENTS

| | | |
|---|---|---|
| 2014/0380324 A1 | 12/2014 | Xiao et al. |
| 2015/0199136 A1 | 7/2015 | Faulkner et al. |
| 2019/0129653 A1* | 5/2019 | Yang ..................... G06F 3/0689 |
| 2019/0138244 A1 | 5/2019 | Singh et al. |
| 2021/0058328 A1 | 2/2021 | Xu et al. |
| 2021/0349749 A1* | 11/2021 | Guha .................. H04L 43/0882 |
| 2024/0163230 A1* | 5/2024 | Danivas .............. H04L 49/3063 |

FOREIGN PATENT DOCUMENTS

| | | | |
|---|---|---|---|
| CN | 112463368 A | * | 3/2021 |
| CN | 113645150 A | | 11/2021 |
| CN | 115543761 A | | 12/2022 |

\* cited by examiner

METHOD AND APPARATUS FOR SUPPORTING IOPS BURST, ELECTRONIC DEVICE, AND MEDIUM

CROSS-REFERENCE TO RELATED APPLICATION

The present disclosure claims the priority of Chinese patent application filed on Nov. 28, 2022 before the CNIPA, China National Intellectual Property Administration with the application number of 202211498305.0, and the title of "METHOD AND APPARATUS FOR SUPPORTING IOPS BURST, ELECTRONIC DEVICE AND READABLE STORAGE MEDIUM", which is incorporated herein in its entirety by reference.

FIELD

Embodiments of the present disclosure relate to the field of storage technologies, and more particularly to a method for supporting an input/output operations per second (IOPS) burst, an apparatus for supporting an IOPS burst, an electronic device and a non-transitory computer readable storage medium.

BACKGROUND

In traditional end-to-end network communications, traditional internet protocol (IP) networks do not treat all messages differently. At the same time, network devices process messages using a first in first out (FIFO) policy, which allocates and forwards required resources according to a sequence of arrival times of the messages, and all messages share resources such as network and bandwidths of devices. In this way, when network congestion occurs, the communication quality of some key services cannot be guaranteed, which further affects the customer experience. Therefore, network quality of service (QoS) is needed to solve this problem. In addition, storage QoS is similar to the network QoS, and the storage QoS ensures that specific applications or workloads can always obtain a specific performance level. For storage clusters, this level is usually expressed as input/output operations per second (IOPS). The IOPS can allocate volumes with different levels of QoS for different applications, so as to specify priority levels by performing flow limiting on different volumes, thereby ensuring that high priority applications can obtain better read/write performance under the condition that fixed storage processing capacity and fixed bandwidth are currently stored.

In the storage clusters, input/output (I/O) storms are also frequently encountered. In general, IOPS peaks generated by a relational database are very sharp protrusions, and database loading and table scanning need data throughput operations having a peak form. When starting a virtual machine, an I/O storm will also occur. The I/O storm is accompanied by following phenomena, for example, in a short time, only a few storage volumes will produce the I/O storm; a duration of the I/O storm is not long; in most instances, loads of the whole storage clusters are not high. Therefore, how to solve the contradiction between the I/O storm and the flow limiting has become a problem that storage technicians need to solve.

SUMMARY

Some embodiments of the present disclosure provide a method and an apparatus for supporting an input/output operations per second (IOPS) burst, an electronic device and a medium, so as to solve the contradiction between the I/O storm and the flow limiting.

Some embodiments of the present disclosure disclose a method for supporting an input/output operations per second (IOPS) burst, applied to a storage cluster including one or more storage volumes and a token bucket, wherein the token bucket includes a plurality of tokens, and the token bucket includes a storage volume primary bucket, a storage volume burst capacity bucket and a storage volume burst rate bucket, wherein the storage volume primary bucket is used to control a maximum IOPS of the storage volumes, the storage volume burst capacity bucket is used to control an IOPS burst duration of the storage volumes, and the storage volume burst rate bucket is used to control an IOPS burst rate of the storage volumes, the method includes:

in response to an input/output (I/O) read/write operation for each of the storage volumes, recording a current I/O read/write time and an I/O quantity of the I/O read/write operation;

calculating a time difference between the current I/O read/write time and a previous I/O read/write time, and updating a capacity of the storage volume primary bucket and a capacity of the storage volume burst rate bucket according to the time difference and a preset token inflow bucket rate;

determining a state of I/O in the I/O read/write operation according to the I/O quantity and a size relationship among an updated capacity of the storage volume primary bucket, an updated capacity of the storage volume burst rate bucket and a capacity of the storage volume burst capacity bucket, wherein the state of the I/O is used to reflect a state of IOPS; and performing corresponding processing on the I/O according to the state of the I/O.

In some embodiments, before in response to the input/output (I/O) read/write operation for each of the storage volumes, recording a current I/O read/write time and an I/O quantity of the I/O read/write operation, the method further includes:

obtaining a configuration and a scale of the storage cluster;

obtaining a total I/O processing capacity of the storage cluster according to the configuration and the scale of the storage cluster, wherein the total I/O processing capacity of the storage cluster is represented by a number of tokens in the token bucket;

creating a storage volume in the storage cluster in response to a number of tokens corresponding to the total I/O processing capacity of the storage cluster being greater than or equal to a preset token value required for creating the storage volume in the storage cluster; and prohibiting creating the storage volume in the storage cluster in response to the number of tokens corresponding to the total I/O processing capacity of the storage cluster being less than the preset token value required for creating the storage volume in the storage cluster.

In some embodiments, the total I/O processing capacity of the storage cluster includes a maximum IOPS processing capacity and a burst IOPS processing capacity, wherein a number of tokens corresponding to the maximum IOPS processing capacity and a number of tokens corresponding to the burst IOPS processing capacity are allocated by the total I/O processing capacity.

In some embodiments, the method further includes:
in response to creating the storage volume in the storage cluster, setting a maximum IOPS and a burst IOPS of the storage volume.

In some embodiments, the maximum IOPS and the burst IOPS of the storage volume correspond to a number of tokens that consume the maximum IOPS processing capacity and the burst IOPS processing capacity of the storage cluster.

In some embodiments, a number of tokens in the token bucket represents a capacity of the token bucket, the capacity of the storage volume primary bucket corresponds to a number of tokens in the storage volume primary bucket, the capacity of the storage volume burst capacity bucket corresponds to a number of tokens in the storage volume burst capacity bucket, and the capacity of the storage volume burst rate bucket corresponds to a number of tokens in the storage volume burst rate bucket.

In some embodiments, the preset token inflow bucket rate includes a preset token inflow primary bucket rate, and calculating the time difference between the current I/O read/write time and the previous I/O read/write time, and updating the capacity of the storage volume primary bucket and the capacity of the storage volume burst rate bucket according to the time difference and the preset token inflow bucket rate includes:
  in response to the I/O read/write operation for the storage volume, obtaining the current I/O read/write time of the I/O read/write operation;
  calculating the time difference between the current I/O read/write time and the previous I/O read/write time according to the current I/O read/write time and the previous I/O read/write time; and
  updating the capacity of the storage volume primary bucket according to the time difference and the preset token inflow primary bucket rate, wherein the capacity of the storage volume primary bucket is a product of the time difference and the preset token inflow primary bucket rate.

In some embodiments, the preset token inflow bucket rate includes a preset token inflow burst bucket rate, and calculating the time difference between the current I/O read/write time and the previous I/O read/write time, and updating the capacity of the storage volume primary bucket and the capacity of the storage volume burst rate bucket according to the time difference and the preset token inflow bucket rate includes:
  in response to the I/O read/write operation for the storage volume, obtaining the current I/O read/write time of the I/O read/write operation;
  calculating the time difference between the current I/O read/write time and the previous I/O read/write time according to the current I/O read/write time and the previous I/O read/write time; and
  updating the capacity of the storage volume burst rate bucket according to the time difference and the preset token inflow burst bucket rate, wherein the capacity of the storage volume burst rate bucket is a product of the time difference and the preset token inflow burst bucket rate.

In some embodiments, the storage volume burst capacity bucket is provided with a bucket capacity recovery timer, and the method further includes:
  in response to consuming a number of tokens in the storage volume primary bucket due to the I/O quantity of the I/O read/write operation being less than or equal to the capacity of the storage volume primary bucket, if the bucket capacity recovery timer of the storage volume burst capacity bucket is not started, starting the bucket capacity recovery timer; and
  in response to a burst time interval of I/O bursts reaching a preset burst interval duration, updating a capacity state of the storage volume burst capacity bucket to a full bucket state, and stopping using the bucket capacity recovery timer.

In some embodiments, the storage volume burst capacity bucket is provided with a bucket capacity emptying timer, and the method further includes:
  in response to consuming a number of tokens in the storage volume burst capacity bucket and a number of tokens in the storage volume burst rate bucket due to the I/O quantity of the I/O read/write operation being greater than the capacity of the storage volume primary bucket and less than the capacity of the storage volume burst capacity bucket and the capacity of the storage volume burst rate bucket, if the bucket capacity emptying timer of the storage volume burst capacity bucket is not started, starting the bucket capacity emptying timer; and
  in response to a burst duration of I/O burst reaching a preset burst duration, updating a capacity state of the storage volume burst capacity bucket to an empty bucket state, and stopping using the bucket capacity emptying timer.

In some embodiments, the method further includes:
  in response to performing the I/O read/write operation on the storage volume, consuming one or more tokens in the token bucket, wherein a number of tokens consumed in the token bucket is the same as the I/O quantity of the I/O read/write operation.

In some embodiments, determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket includes:
  in response to the I/O quantity of the I/O read/write operation being less than or equal to the capacity of the storage volume primary bucket, consuming a number of tokens in the storage volume primary bucket, wherein the number of tokens consumed in the storage volume primary bucket is the same as the I/O quantity of the I/O read/write operation; and
  in response to the number of tokens consumed in the storage volume primary bucket being equal to the I/O quantity and a number of tokens in the storage volume burst capacity bucket and a number of tokens in the storage volume burst rate bucket remaining unchanged, determining that the state of I/O in the I/O read/write operation is normal I/O.

In some embodiments, determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket includes:
  in response to the I/O quantity of the I/O read/write operation being greater than the capacity of the storage volume primary bucket and less than the capacity of the storage volume burst capacity bucket and the capacity of the storage volume burst rate bucket, consuming a number of tokens in the storage volume burst capacity bucket and a number of tokens in the storage volume burst rate bucket, wherein the number of tokens consumed in the storage volume burst capacity bucket and the number of tokens consumed in the storage volume burst rate bucket are both the same as the I/O quantity of the I/O read/write operation; and in response to the number of tokens consumed in the storage volume burst capacity bucket and the number of tokens consumed in the storage volume burst rate bucket being both equal to the I/O quantity and a number of tokens in the storage volume primary bucket remaining unchanged, determining that the state of I/O in the I/O read/write operation is burst I/O.

In some embodiments, determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket includes:

in response to the I/O quantity of the I/O read/write operation being greater than the capacity of the storage volume primary bucket, the capacity of the storage volume burst capacity bucket and the capacity of the storage volume burst rate bucket, determining that a condition for performing a read/write operation on the I/O is not met; and in response to a number of tokens consumed in the storage volume primary bucket, a number of tokens consumed in the storage volume burst capacity bucket and a number of tokens consumed in the storage volume burst rate bucket being all zero, remaining a number of tokens in the storage volume primary bucket, a number of tokens in the storage volume burst capacity bucket and a number of tokens in the storage volume burst rate bucket unchanged, and determining that the state of I/O in the I/O read/write operation is I/O exceeding a burst limit.

In some embodiments, performing corresponding processing on the I/O according to the state of the I/O includes:

in response to the state of the I/O in the I/O read/write operation being normal I/O, performing a normal read/write operation on the normal I/O;

in response to the state of the I/O in the I/O read/write operation being burst I/O, performing a normal read/write operation on the burst I/O; and in response to the state of the I/O in the I/O read/write operation being I/O exceeding a burst limit, splitting the I/O exceeding the burst limit.

In some embodiments, the method further includes:

marking I/O in different states with specified colors respectively, wherein the normal I/O is marked in green, the burst I/O is marked in yellow, and the I/O exceeding the burst limit is marked in red.

In some embodiments, after in response to the state of the I/O in the I/O read/write operation being I/O exceeding the burst limit, splitting the I/O exceeding the burst limit, the method further includes:

obtaining new I/O after splitting the I/O exceeding the burst limit; and taking the new I/O as the I/O, and returning to the step of in response to the I/O read/write operation for each of the storage volumes, recording the current I/O read/write time and the I/O quantity of the I/O read/write operation.

Some embodiments of the present disclosure further disclose an apparatus for supporting an input/output operations per second (IOPS) burst, applied to a storage cluster including one or more storage volumes and a token bucket, wherein the token bucket includes a plurality of tokens, and the token bucket includes a storage volume primary bucket, a storage volume burst capacity bucket and a storage volume burst rate bucket, wherein the storage volume primary bucket is used to control a maximum IOPS of the storage volumes, the storage volume burst capacity bucket is used to control an IOPS burst duration of the storage volumes, and the storage volume burst rate bucket is used to control an IOPS burst rate of the storage volumes, the apparatus includes:

a data recording module configured to in response to an input/output (I/O) read/write operation for each of the storage volumes, record a current I/O read/write time and an I/O quantity of the I/O read/write operation;

a capacity update module configured to calculate a time difference between the current I/O read/write time and a previous I/O read/write time, and update a capacity of the storage volume primary bucket and a capacity of the storage volume burst rate bucket according to the time difference and a preset token inflow bucket rate;

an I/O state determination module configured to determine a state of I/O in the I/O read/write operation according to the I/O quantity and a size relationship among an updated capacity of the storage volume primary bucket, an updated capacity of the storage volume burst rate bucket and a capacity of the storage volume burst capacity bucket, wherein the state of the I/O is used to reflect a state of IOPS; and an I/O processing module configured to perform corresponding processing on the I/O according to the state of the I/O.

In some embodiments, the preset token inflow bucket rate includes a preset token inflow primary bucket rate, and the capacity update module is configured to:

in response to the I/O read/write operation for the storage volume, obtain the current I/O read/write time of the I/O read/write operation;

calculate the time difference between the current I/O read/write time and the previous I/O read/write time according to the current I/O read/write time and the previous I/O read/write time; and update the capacity of the storage volume primary bucket according to the time difference and the preset token inflow primary bucket rate, wherein the capacity of the storage volume primary bucket is a product of the time difference and the preset token inflow primary bucket rate.

In some embodiments, the preset token inflow bucket rate includes a preset token inflow burst bucket rate, and the capacity update module is configured to:

in response to the I/O read/write operation for the storage volume, obtain the current I/O read/write time of the I/O read/write operation;

calculate the time difference between the current I/O read/write time and the previous I/O read/write time according to the current I/O read/write time and the previous I/O read/write time; and update the capacity of the storage volume burst rate bucket according to the time difference and the preset token inflow burst bucket rate, wherein the capacity of the storage volume burst rate bucket is a product of the time difference and the preset token inflow burst bucket rate.

In some embodiments, the I/O state determination module is configured to:

in response to the I/O quantity of the I/O read/write operation being less than or equal to the capacity of the storage volume primary bucket, consume a number of tokens in the storage volume primary bucket, wherein the number of tokens consumed in the storage volume primary bucket is the same as the I/O quantity of the I/O read/write operation; and in response to the number of tokens consumed in the storage volume primary bucket being equal to the I/O quantity and a number of tokens in the storage volume burst capacity bucket and a number of tokens in the storage volume burst rate bucket remaining unchanged, determine that the state of I/O in the I/O read/write operation is normal I/O.

In some embodiments, the I/O state determination module is configured to:

in response to the I/O quantity of the I/O read/write operation being greater than the capacity of the storage volume primary bucket and less than the capacity of the storage volume burst capacity bucket and the capacity of the storage volume burst rate bucket, consume a number of tokens in the storage volume burst capacity bucket and a number of tokens in the storage volume burst rate bucket, wherein the number of tokens consumed in the storage volume burst capacity bucket and the number of tokens consumed in the storage volume burst rate bucket are both the same as the I/O quantity of the I/O read/write operation; and in response to the number of tokens consumed in the storage volume burst capacity bucket and the number of tokens consumed in the storage volume burst rate bucket being both equal to the I/O quantity and a number of tokens in the storage volume primary bucket remaining unchanged, determine that the state of I/O in the I/O read/write operation is burst I/O.

In some embodiments, the I/O state determination module is configured to:

in response to the I/O quantity of the I/O read/write operation being greater than the capacity of the storage volume primary bucket, the capacity of the storage volume burst capacity bucket and the capacity of the storage volume burst rate bucket, determine that a condition for performing a read/write operation on the I/O is not met; and in response to a number of tokens consumed in the storage volume primary bucket, a number of tokens consumed in the storage volume burst capacity bucket and a number of tokens consumed in the storage volume burst rate bucket being all zero, remain a number of tokens in the storage volume primary bucket, a number of tokens in the storage volume burst capacity bucket and a number of tokens in the storage volume burst rate bucket unchanged, and determine that the state of I/O in the I/O read/write operation is I/O exceeding a burst limit.

In some embodiments, the I/O processing module is configured to:

in response to the state of the I/O in the I/O read/write operation being normal I/O, perform a normal read/write operation on the normal I/O;

in response to the state of the I/O in the I/O read/write operation being burst I/O, perform a normal read/write operation on the burst I/O; and in response to the state of the I/O in the I/O read/write operation being I/O exceeding a burst limit, split the I/O exceeding the burst limit.

Some embodiments of the present disclosure further disclose an electronic device including a processor, a communication interface, a memory and a communication bus, wherein the processor, the communication interface and the memory communicate with each other through the communication bus;

the memory is configured to store computer programs; and the processor is configured to implement the above method for supporting the IOPS burst when executing the computer programs stored in the memory.

Some embodiments of the present disclosure further disclose a non-transitory computer readable storage medium storing instructions, wherein the instructions, when executed by one or more processors, cause the processors to perform the above method for supporting the IOPS burst.

Some embodiments of the present disclosure can include the following advantages.

In some embodiments, the method is applied to a storage cluster including one or more storage volumes and a token bucket, where the token bucket includes a plurality of tokens, and the token bucket includes a storage volume primary bucket, a storage volume burst capacity bucket and a storage volume burst rate bucket, where the storage volume primary bucket is used to control a maximum IOPS of the storage volumes, the storage volume burst capacity bucket is used to control an IOPS burst duration of the storage volumes, and the storage volume burst rate bucket is used to control an IOPS burst rate of the storage volumes, in response to an input/output (I/O) read/write operation for each of the storage volumes, recording a current I/O read/write time and an I/O quantity of the I/O read/write operation; calculating a time difference between the current I/O read/write time and a previous I/O read/write time, and updating a capacity of the storage volume primary bucket and a capacity of the storage volume burst rate bucket according to the time difference and a preset token inflow bucket rate; determining a state of I/O in the I/O read/write operation according to the I/O quantity and a size relationship among an updated capacity of the storage volume primary bucket, an updated capacity of the storage volume burst rate bucket and a capacity of the storage volume burst capacity bucket, where the state of the I/O is used to reflect a state of IOPS; and performing corresponding processing on the I/O according to the state of the I/O. By controlling the maximum IOPS of the storage volumes through the storage volume primary bucket, controlling the IOPS burst duration of the storage volumes through the storage volume burst capacity bucket, and controlling the IOPS burst rate of the storage volumes through the storage volume burst rate bucket, the upper limit of the IOPS of the storage volume business, the rate, the duration and the interval time when the IOPS of the storage volume business bursts excessively can be further controlled. Further, through the interaction and coordination among the storage volume primary bucket, the storage volume burst capacity bucket and the storage volume burst rate bucket, the state of I/O can be determined and processed accordingly, thereby effectively improving the I/O processing policy, ensuring the resource isolation among the storage volumes, and ensuring that the storage volumes do not affect each other.

In addition, when creating a storage volume in the storage cluster, by setting the maximum IOPS processing capacity and burst IOPS processing capacity of the storage cluster, it can be controlled that the storage cluster does not exceed the support capacity of the storage cluster when creating the storage volume, thereby ensuring that the load of all storage volumes does not exceed the load of the storage cluster.

DETAILED DESCRIPTION

Figure 1:
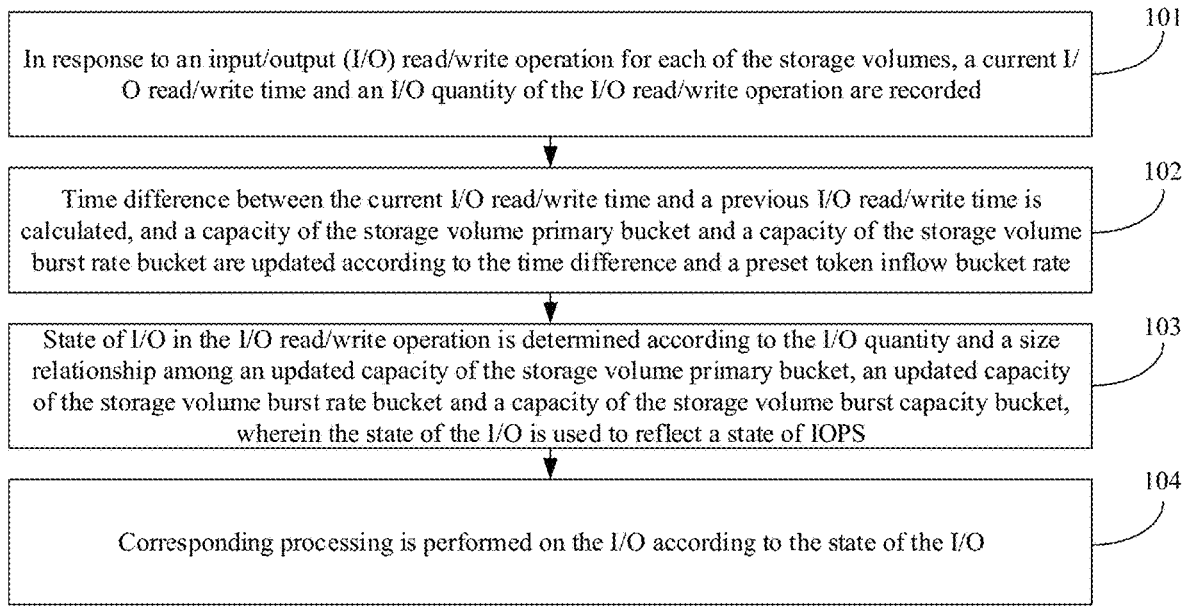
FIG. 1 is a flowchart of a method for supporting an input/output operations per second (IOPS) burst provided by some embodiments of the present disclosure.

To make the objectives, features, and advantages of the present disclosure more apparent and understandable, the following describes specific implementations of the present disclosure in detail with reference to the accompanying drawings.

In order to enable a person skilled in the art to better understand technical solutions of some embodiments of the present disclosure, some technical features involved in some embodiments of the present disclosure are described and explained below.

Input/output operations per second (IOPS) is a measurement method used to test the performance of computer storage devices (for example, hard disk drive (HDD), solid state drives (SSD) or storage area network (SAN)), which is often used in databases and other occasions to measure the performance of random access.

Quality of service (QoS) provides end-to-end quality of service according to different requirements of different service types.

Storage QoS is an essential key technology in the storage field, which can reasonably allocate storage resources, effectively alleviate or control the preemption of resources by application services, and achieve the effects of flow monitoring, reasonable resource allocation, important service quality assurance and internal flow avoidance under the condition of ensuring service bandwidth and IOPS.

In order to solve the contradiction between the I/O storm and the flow limiting, it is necessary to make the IOPS of each storage volume exceed the limit of the QoS in a short time to cope with the I/O storm. In the long run, the average IOPS and the average throughput of each storage volume still need to be limited to achieve the purpose of the flow limiting. Therefore, the demand for storage volume to support burst IOPS has emerged. In the related art, common QoS flow limiting algorithms include a fixed window algorithm, a sliding window algorithm and a token bucket algorithm. These technologies are briefly introduced below.

1. Fixed Window Algorithm

The fixed window algorithm is a relatively simple flow limiting algorithm, and the principle of the fixed window algorithm is to count requests within a certain time interval, compare a number of the requests with a threshold value to determine whether flow limiting is needed, and once a preset time critical point is reached, clear a counter. This algorithm is easy to understand and simple to realize, the disadvantage thereof is that flow control is not precise enough, and it is easy to double the flow. Therefore, it is suitable for a model with flat flow and allowing flow to double.

2. Sliding Window Algorithm

The sliding window algorithm is an upgraded version of the fixed window algorithm, which can avoid the problem of flow doubling caused by the fixed window algorithm. The principle of the sliding window algorithm is that a time window is subdivided into several intervals, for example, one window per second (60 requests are allowed at most), and now it is divided into three intervals per second, and each of the three intervals is allowed to pass 20 requests at most. Each interval has an independent counter, and thus it can be understood that an interval is a flow limiting window in the fixed window algorithm. This algorithm is more accurate for flow control and solves the problem of flow doubling caused by the fixed window algorithm. The disadvantage thereof is that the granularity of interval division is not easy to determine, if the granularity is too small, computing resources will be increased, and if the granularity is too large, the overall flow curve will not be smooth enough, thereby causing the system load to fluctuate between high and low. Therefore, it is suitable for a model with stable flow and no sudden increase of a large amount of flow.

3. Token Bucket Algorithm

There is a fixed token bucket in which tokens are stored. The principle of the token bucket algorithm is that at the beginning, the token bucket is empty; a system adds one or more tokens to the token bucket at a fixed rate until the token bucket is full, and redundant requests will be discarded; when a request occurs, a token is removed from the token bucket, and if the token bucket is empty, the request is rejected or blocked. The characteristics of the token bucket include: the tokens are put into the token bucket at the fixed rate; there are at most B (assumed value) tokens in the token bucket, when the token bucket is full, newly added tokens are discarded or rejected; if there are less than N (assumed value) tokens in the token bucket, the tokens will not be deleted and the request will be restricted (dropped or blocked).

As an example, when network congestion occurs, the communication quality of some key services cannot be guaranteed, which further affects the customer experience. Therefore, QoS is needed to solve this problem. In addition, storage QoS is similar to the network QoS, and the storage QoS ensures that specific applications or workloads can always obtain a specific performance level. For storage clusters, this level is usually expressed as IOPS. The IOPS can allocate volumes with different levels of QoS for different applications, so as to specify priority levels by performing flow limiting on different volumes, thereby ensuring that high priority applications can obtain better read/write performance under the condition that fixed storage processing capacity and fixed bandwidth are currently stored. In the storage clusters, I/O storms are also frequently encountered. In general, IOPS peaks generated by a relational database are very sharp protrusions, and database loading and table scanning need data throughput operations having a peak form. When starting a virtual machine, an I/O storm will also occur. Therefore, how to solve the contradiction between the I/O storm and the flow limiting has become a problem that storage technicians need to solve.

In this regard, one of core invention points of some embodiments of the present disclosure lies in that, the method is applied to a storage cluster including one or more storage volumes and a token bucket, where the token bucket includes a plurality of tokens, and the token bucket includes a storage volume primary bucket, a storage volume burst capacity bucket and a storage volume burst rate bucket, where the storage volume primary bucket is used to control a maximum IOPS of the storage volumes, the storage volume burst capacity bucket is used to control an IOPS burst duration of the storage volumes, and the storage volume burst rate bucket is used to control an IOPS burst rate of the storage volumes, in response to an input/output (I/O) read/write operation for each of the storage volumes, recording a current I/O read/write time and an I/O quantity of the I/O read/write operation; calculating a time difference between the current I/O read/write time and a previous I/O read/write time, and updating a capacity of the storage volume primary bucket and a capacity of the storage volume burst rate bucket according to the time difference and a preset token inflow bucket rate; determining a state of I/O in the I/O read/write operation according to the I/O quantity and a size relationship among an updated capacity of the storage volume primary bucket, an updated capacity of the storage volume burst rate bucket and a capacity of the storage volume burst capacity bucket, where the state of the I/O is used to reflect a state of IOPS; and performing corresponding processing on the I/O according to the state of the I/O. By controlling the maximum IOPS of the storage volumes through the storage volume primary bucket, controlling the IOPS burst duration of the storage volumes through the storage volume burst capacity bucket, and controlling the IOPS burst rate of the storage volumes through the storage volume burst rate bucket, the upper limit of the IOPS of the storage volume business, the rate, the duration and the interval time when the IOPS of the storage volume business bursts excessively can be further controlled. Further, through the interaction and coordination among the storage volume primary bucket, the storage volume burst capacity bucket and the storage volume burst rate bucket, the state of I/O can be determined and processed accordingly, thereby effectively improving the I/O processing policy, ensuring the resource isolation among the storage volumes, and ensuring that the storage volumes do not affect each other. In addition, when creating a storage volume in the storage cluster, by setting the maximum IOPS processing capacity and burst IOPS processing capacity of the storage cluster, it can be controlled that the storage cluster does not exceed the support capacity of the storage cluster when creating the storage volume, thereby ensuring that the load of all storage volumes does not exceed the load of the storage cluster.

Referring to FIG. 1, FIG. 1 shows a flowchart of a method for supporting an input/output operations per second (IOPS) burst provided by some embodiments of the present disclosure. which is applied to a storage cluster. The method is applied to a storage cluster including one or more storage volumes and a token bucket, wherein the token bucket includes a plurality of tokens, and the token bucket includes a storage volume primary bucket, a storage volume burst capacity bucket and a storage volume burst rate bucket, wherein the storage volume primary bucket is used to control a maximum IOPS of the storage volumes, the storage volume burst capacity bucket is used to control an IOPS burst duration of the storage volumes, and the storage volume burst rate bucket is used to control an IOPS burst rate of the storage volumes, the method can include the following steps.

Step 101, in response to an input/output (I/O) read/write operation for each of the storage volumes, a current I/O read/write time and an I/O quantity of the I/O read/write operation are recorded.

For the storage volumes, they are located on one or more storage clusters, and a storage cluster can include one or more storage volumes. For the storage clusters, a storage cluster can carry a plurality of physical disks, and the storage cluster can create logical space concepts based on the plurality of physical disks, for example, creating pools and storage volumes. For the I/O read/write operation, it refers to an I/O read/write operation performed for each of the storage volumes.

For the maximum IOPS of the storage volume, it refers to a number of I/O that the storage volume allows to read and write per second, and can be set when creating the storage volume. For the IOPS burst duration of the storage volume, it can be a burst duration after the number of I/O that the storage volume allows to read and write per second exceeds a fixed average value. For the IOPS burst rate of the storage volume, it can be a maximum burst rate allowed to burst after the number of I/O that the storage volume allows to read and write per second exceeds the fixed average value. Since the number of I/O that the storage volume allows to read and write per second can be proportional to the burst rate, the IOPS burst rate of the storage volume can also be expressed as a maximum burst value allowed to burst after the number of I/O that the storage volume allows to read and write per second exceeds the fixed average value. For the fixed average value, it can be a fixed average value limited by the maximum IOPS of the storage volume, that is, client business applications are not allowed to read and write the I/O of the storage volume more than the fixed average value per second. However, in the case of I/O storms, the client business applications have situations that instantaneous I/O read/write will exceed the fixed average value per second, and thus burst IOPS is introduced, that is, while limiting the IOPS, the client business applications are allowed to fluctuate beyond the fixed average value. At the same time, the allowed fluctuation cannot always exceed the fixed average value, and thus the IOPS burst duration and the IOPS burst rate of the storage volumes are introduced to ensure that the fixed average value cannot be exceeded indefinitely.

For the token bucket, tokens are stored in the token bucket. At the beginning, the token bucket is empty; a system adds tokens to the token bucket at a fixed rate until the token bucket is full, and newly added tokens will be discarded. When an I/O request occurs, corresponding tokens in the token bucket will be consumed. If there are not enough tokens in the token bucket or the token bucket is empty, the I/O request will be rejected or blocked. The token bucket is allowed to burst, but is not allowed to exceed the burst limit. The token bucket includes a storage volume primary bucket, a storage volume burst capacity bucket and a storage volume burst rate bucket. For the storage volume primary bucket, it is used to control the maximum IOPS of the storage volumes; for the storage volume burst capacity bucket, it is used to control the IOPS burst duration of the storage volumes, and for the storage volume burst rate bucket, it is used to control the IOPS burst rate of the storage volumes.

For the current I/O read/write time, it refers to a real-time time when I/O read/write occurs, so that the system can monitor the duration of each I/O read/write operation and the time difference from a previous I/O read/write operation. For the I/O quantity, it refers to a quantity corresponding to the occurrence of I/O on the storage volume. According to the I/O quantity, it is beneficial to determine the state of I/O in the future.

When I/O read/write operation of each storage volume occurs, the current I/O read/write time is recorded, which is beneficial to monitor the duration of each I/O read/write operation and the time difference from the previous I/O read/write operation or the next I/O read/write operation, and thus I/O processing policies can be better formulated. At the same time, the I/O quantity corresponding to the occurrence of the current I/O is recorded, and thus it is beneficial to determine the state of I/O in the future.

Step 102, a time difference between the current I/O read/write time and a previous I/O read/write time is calculated, and a capacity of the storage volume primary bucket and a capacity of the storage volume burst rate bucket are updated according to the time difference and a preset token inflow bucket rate.

For the time difference, it refers to an interval duration between the current I/O read/write time and the previous I/O read/write time. For the preset token inflow bucket rate, it refers to a preset constant rate. In some embodiments, tokens flow into the token bucket at the preset constant rate to calculate the number of tokens in the token bucket and update the capacity of the token bucket.

For the capacity of the storage volume primary bucket, it refers to an upper limit of the maximum IOPS allowed by the storage volume in an instant, which can correspond to a number of tokens in the storage volume primary bucket. For the capacity of the storage volume burst rate bucket, it can correspond to a number of tokens in the storage volume burst rate bucket.

When the I/O read/write operation of the storage volume occurs, the I/O read/write time and the I/O quantity of the current I/O read/write operation are recorded; the I/O read/write time corresponding to the previous I/O read/write operation and the I/O read/write time corresponding to the current I/O read/write operation are extracted from the records, and the current I/O read/write time and the previous I/O read/write time are calculated to obtain the time difference between the current I/O read/write operation and the previous I/O read/write operation; and the capacity of the storage volume primary bucket and the capacity of the storage volume burst rate bucket are updated based on the relationship between the obtained time difference and the preset token inflow bucket rate. By calculating the time difference between the current I/O read/write time and the previous I/O read/write time, and updating the capacity of the storage volume primary bucket and the capacity of the storage volume burst rate bucket according to the time difference and the preset token inflow bucket rate, the duration of the I/O read/write operation and the time interval between the current I/O read/write time and the previous I/O read/write time or the next I/O read/write time can be obtained in real time, and thus it is beneficial to control the IOPS burst duration of the storage volume.

Step 103, a state of I/O in the I/O read/write operation is determined according to the I/O quantity and a size relationship among an updated capacity of the storage volume primary bucket, an updated capacity of the storage volume burst rate bucket and a capacity of the storage volume burst capacity bucket, wherein the state of the I/O is used to reflect a state of IOPS.

For the storage volume burst rate bucket, it can be used to control the IOPS burst rate of the storage volumes, that is, it can be used to limit the maximum I/O rate when I/O bursts. For the state of I/O, it can be normal I/O, burst I/O and I/O exceeding a burst limit, and thus I/O can be processed differently according to different states of I/O.

For the state of IOPS, it can be reflected by the state of I/O. If the IOPS received or sent by a storage device or an application program remains relatively stable or constant for a period of time, it is the normal I/O. Similarly, if the IOPS per unit time suddenly increases and is within a range of the burst limit, it is the burst I/O; and if the IOPS per unit time suddenly increases and exceeds the range of the burst limit, it is the I/O exceeding the burst limit.

When the I/O read/write operation of the storage volume occurs, the I/O read/write time and the I/O quantity of the current I/O read/write operation are recorded; the I/O read/write time corresponding to the previous I/O read/write operation and the I/O read/write time corresponding to the current I/O read/write operation are extracted from the records, and the current I/O read/write time and the previous I/O read/write time are calculated to obtain the time difference between the current I/O read/write operation and the previous I/O read/write operation; the capacity of the storage volume primary bucket and the capacity of the storage volume burst rate bucket are updated based on the relationship between the obtained time difference and the preset token inflow bucket rate; and then the state of I/O in the I/O read/write operation is determined according to the I/O quantity and the size relationship among the updated capacity of the storage volume primary bucket, the updated capacity of the storage volume burst rate bucket and the capacity of the storage volume burst capacity bucket, where the state of the I/O is used to reflect the state of IOPS. By determining the state of I/O in the I/O read/write operation, different processing can be performed on I/O with different types, and more perfect I/O processing policies can be formulated, so that the storage volume can meet the burst throughput requirements of I/O storm scenarios. Further, the flow limiting can be performed on the storage volume, and it is ensured that the storage volumes are isolated from each other and do not affect each other.

Step 104, corresponding processing is performed on the I/O according to the state of the I/O.

For the state of I/O, it can be normal I/O, burst I/O or I/O exceeding the burst limit. For processing, it can include normal read/write and splitting.

The normal read/write operation is performed on normal I/O and burst I/O, and split processing is performed on I/O exceeding the burst limit, I/O exceeding the burst limit generates new I/O after splitting, and the new I/O needs to be re-queued and waited until the normal read/write operation can be performed, thereby effectively improving the I/O processing policies, realizing the flow limiting of the storage volumes, and ensuring that the storage volumes are isolated from each other and do not affect each other.

In some embodiments, the method is applied to a storage cluster including one or more storage volumes and a token bucket, where the token bucket includes a plurality of tokens, and the token bucket includes a storage volume primary bucket, a storage volume burst capacity bucket and a storage volume burst rate bucket, where the storage volume primary bucket is used to control a maximum IOPS of the storage volumes, the storage volume burst capacity bucket is used to control an IOPS burst duration of the storage volumes, and the storage volume burst rate bucket is used to control an IOPS burst rate of the storage volumes, in response to an input/output (I/O) read/write operation for each of the storage volumes, recording a current I/O read/ write time and an I/O quantity of the I/O read/write operation; calculating a time difference between the current I/O read/write time and a previous I/O read/write time, and updating a capacity of the storage volume primary bucket and a capacity of the storage volume burst rate bucket according to the time difference and a preset token inflow bucket rate; determining a state of I/O in the I/O read/write operation according to the I/O quantity and a size relationship among an updated capacity of the storage volume primary bucket, an updated capacity of the storage volume burst rate bucket and a capacity of the storage volume burst capacity bucket, where the state of the I/O is used to reflect a state of IOPS; and performing corresponding processing on the I/O according to the state of the I/O. By controlling the maximum IOPS of the storage volumes through the storage volume primary bucket, controlling the IOPS burst duration of the storage volumes through the storage volume burst capacity bucket, and controlling the IOPS burst rate of the storage volumes through the storage volume burst rate bucket, the upper limit of the IOPS of the storage volume business, the rate, the duration and the interval time when the IOPS of the storage volume business bursts excessively can be further controlled. Further, through the interaction and coordination among the storage volume primary bucket, the storage volume burst capacity bucket and the storage volume burst rate bucket, the state of I/O can be determined and processed accordingly, thereby effectively improving the I/O processing policy, ensuring the resource isolation among the storage volumes, and ensuring that the storage volumes do not affect each other.

In some embodiments, before in response to the input/output (I/O) read/write operation for each of the storage volumes, recording a current I/O read/write time and an I/O quantity of the I/O read/write operation in step 101, the method can further include:

obtaining a configuration and a scale of the storage cluster;

obtaining a total I/O processing capacity of the storage cluster according to the configuration and the scale of the storage cluster, wherein the total I/O processing capacity of the storage cluster is represented by a number of tokens in the token bucket;

creating a storage volume in the storage cluster in response to a number of tokens corresponding to the total I/O processing capacity of the storage cluster being greater than or equal to a preset token value required for creating the storage volume in the storage cluster; and prohibiting creating the storage volume in the storage cluster in response to the number of tokens corresponding to the total I/O processing capacity of the storage cluster being less than the preset token value required for creating the storage volume in the storage cluster.

For the storage cluster, it aggregates storage spaces in multiple storage devices into a storage pool that can provide a unified access interface and a management interface for application servers. For the storage volume, it is created by the storage cluster. For the preset token value, it refers to a preset condition for creating the storage volume by the storage cluster.

For the total I/O processing capacity of the storage cluster, it is represented by a number of tokens in the token bucket. The total I/O processing capacity of the storage cluster includes a maximum IOPS processing capacity and a burst IOPS processing capacity, where a number of tokens corresponding to the maximum IOPS processing capacity and a number of tokens corresponding to the burst IOPS processing capacity are allocated by the total I/O processing capacity.

Figure 2:
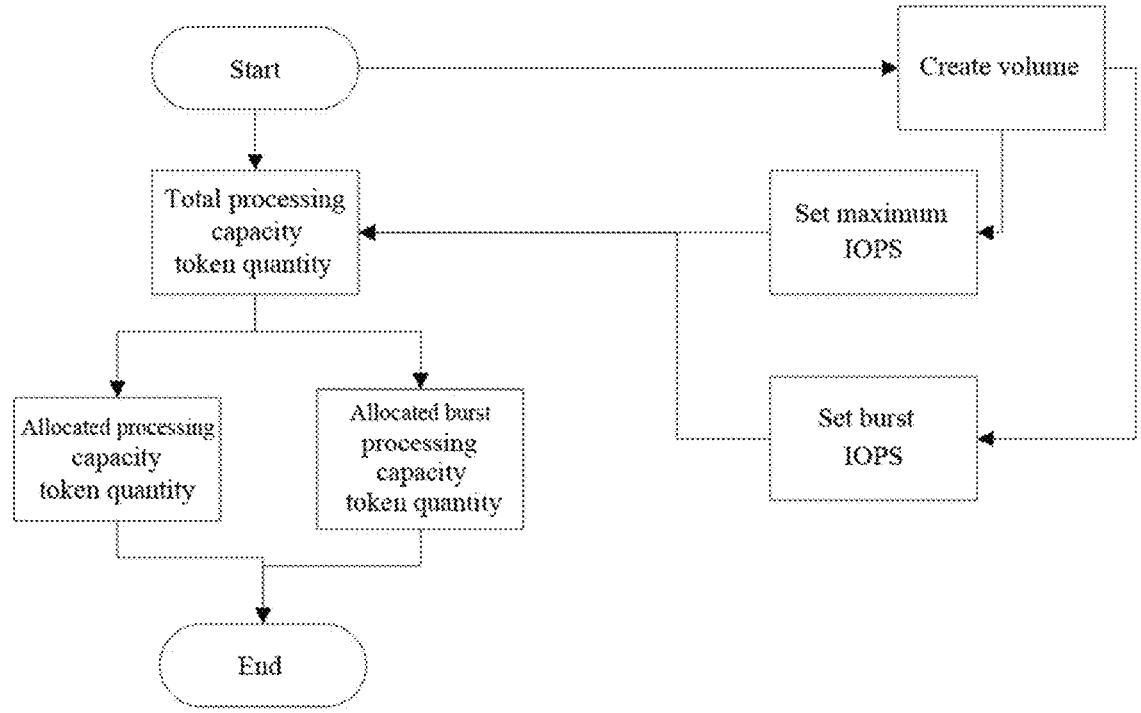
FIG. 2 is a schematic diagram of a processing capacity management of a storage cluster provided by some embodiments of the present disclosure.

Referring to FIG. 2, FIG. 2 shows a schematic diagram of a processing capacity management of a storage cluster provided by some embodiments of the present disclosure. After the deployment of the storage cluster is completed, a total I/O processing capacity of the storage cluster is obtained according to a configuration and a scale of the storage cluster, where the total I/O processing capacity of the storage cluster is represented by a number of tokens in the token bucket (represented as a total processing capacity token quantity in FIG. 2). When creating the total I/O processing capacity of the storage cluster, a maximum IOPS processing capacity and a burst IOPS processing capacity of the storage cluster can be set, where a number of tokens corresponding to the maximum IOPS processing capacity and a number of tokens corresponding to the burst IOPS processing capacity are allocated by the total I/O processing capacity, as shown in FIG. 2, a number of tokens corresponding to the total I/O processing capacity is allocated to the maximum IOPS processing capacity and the burst IOPS processing capacity; further, when the maximum IOPS processing capacity and the burst IOPS processing capacity obtain the corresponding number of tokens, the process of allocating the storage cluster capacity is ended. For example, the maximum IOPS and the burst IOPS of the storage volume correspond to the number of tokens that consume the maximum IOPS processing capacity and the burst IOPS processing capacity of the storage cluster, respectively. When creating a storage volume in a storage cluster, a number of tokens corresponding to the maximum IOPS processing capacity and the burst IOPS processing capacity of the storage cluster is consumed according to the maximum IOPS and the burst IOPS of the storage volume. When the number of tokens corresponding to the maximum IOPS processing capacity or the burst IOPS processing capacity of the storage cluster is exhausted by the storage volume, it indicates that the storage volume in the storage cluster will reach the performance limit of the storage cluster under the maximum load. By setting the maximum IOPS processing capacity and the burst IOPS processing capacity of the storage cluster, the storage cluster can be controlled not to exceed the support capacity of the storage cluster when creating the storage volume, thereby ensuring that the loads of all storage volumes will not exceed the loads of the storage cluster.

In some embodiments, after the deployment of the storage cluster is completed, a total I/O processing capacity of the storage cluster is obtained according to a configuration and a scale of the storage cluster, where the total I/O processing capacity of the storage cluster is represented by a number of tokens in the token bucket. In response to a number of tokens corresponding to the total I/O processing capacity of the storage cluster being greater than or equal to a preset token value required for creating the storage volume in the storage cluster, a storage volume in the storage cluster is created; and in response to the number of tokens corresponding to the total I/O processing capacity of the storage cluster being less than the preset token value required for creating the storage volume in the storage cluster, it is prohibited to create the storage volume in the storage cluster. When creating the storage volume in the storage cluster, by setting the maximum IOPS processing capacity and the burst IOPS processing capacity of the storage cluster, the storage cluster can be controlled not to exceed the support capacity of the storage cluster when creating the storage volume, thereby ensuring that the loads of all storage volumes will not exceed the loads of the storage cluster.

In some embodiments, the preset token inflow bucket rate includes a preset token inflow primary bucket rate, and calculating the time difference between the current I/O read/write time and the previous I/O read/write time, and updating the capacity of the storage volume primary bucket and the capacity of the storage volume burst rate bucket according to the time difference and the preset token inflow bucket rate in step 102 includes:

in response to the I/O read/write operation for the storage volume, obtaining the current I/O read/write time of the I/O read/write operation;

calculating the time difference between the current I/O read/write time and the previous I/O read/write time according to the current I/O read/write time and the previous I/O read/write time; and updating the capacity of the storage volume primary bucket according to the time difference and the preset token inflow primary bucket rate, wherein the capacity of the storage volume primary bucket is a product of the time difference and the preset token inflow primary bucket rate.

For the preset token inflow primary bucket rate, it refers to a preset constant rate at which tokens are added to the storage volume primary bucket, so as to better monitor and manage the capacity of the storage volume primary bucket. For the capacity of the storage volume primary bucket, it corresponds to the number of tokens in the storage volume primary bucket.

In response to the I/O read/write operation for each storage volume, the current I/O read/write time at which the current I/O read/write operation occurs is obtained, the time difference between the current I/O read/write time and the previous I/O read/write time is calculated according to the current I/O read/write time and the previous I/O read/write time, and then the capacity of the storage volume primary bucket is updated according to the time difference and the preset token inflow primary bucket rate, where the capacity of the storage volume primary bucket is a product of the time difference and the preset token inflow primary bucket rate. By calculating the time difference between the current I/O read/write time and the previous I/O read/write time, the capacity of the storage volume primary bucket can be updated quickly and effectively according to the relationship between the time difference and the preset token inflow primary bucket rate.

Figure 3:
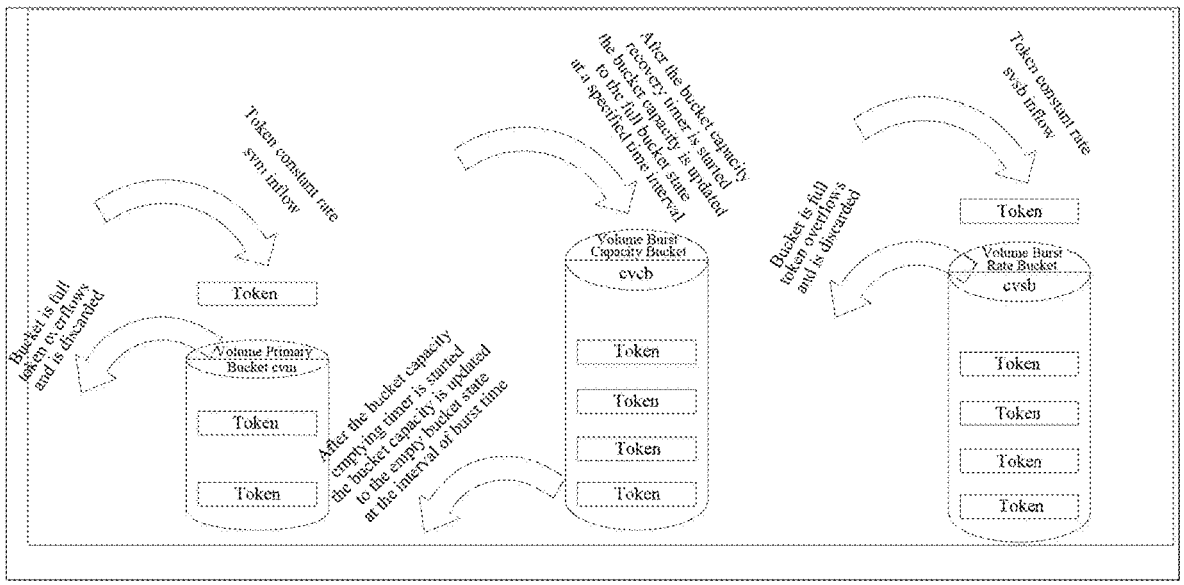
FIG. 3 is a schematic diagram of a processing procedure of a token bucket and a dual timer provided by some embodiments of the present disclosure.

Referring to FIG. 3, FIG. 3 shows a schematic diagram of a processing procedure of a token bucket and a dual timer provided by some embodiments of the present disclosure. When the I/O read/write operation occurs, the current I/O read/write time at which the current I/O read/write operation occurs is recorded, and the time difference between the current I/O read/write time and the previous I/O read/write time is calculated. Assuming that the capacity of the storage volume primary bucket is cvm, the preset token inflow primary bucket rate is svm, where svm is a limit size of the maximum IOPS of the storage volume, and the time difference between the current I/O read/write time and the previous I/O read/write time is t, and thus the capacity of the storage volume primary bucket can be obtained and updated according to the relationship among the time difference, the preset token inflow primary bucket rate and the capacity of the storage volume primary bucket. For example, the capacity cvm of the storage volume primary bucket is the product of the time difference t and the preset token inflow primary bucket rate svm, that is, cvm=scm*t.

In some embodiments, the preset token inflow bucket rate includes a preset token inflow burst bucket rate, and calculating the time difference between the current I/O read/write time and the previous I/O read/write time, and updating the capacity of the storage volume primary bucket and the capacity of the storage volume burst rate bucket according to the time difference and the preset token inflow bucket rate in step 102 includes:

in response to the I/O read/write operation for the storage volume, obtaining the current I/O read/write time of the I/O read/write operation;

calculating the time difference between the current I/O read/write time and the previous I/O read/write time according to the current I/O read/write time and the previous I/O read/write time; and updating the capacity of the storage volume burst rate bucket according to the time difference and the preset token inflow burst bucket rate, wherein the capacity of the storage volume burst rate bucket is a product of the time difference and the preset token inflow burst bucket rate.

For the preset token inflow burst bucket rate, it refers to a preset constant rate at which tokens are added to the storage volume burst rate bucket, so as to better monitor and manage the capacity of the storage volume burst rate bucket. For the capacity of the storage volume burst rate bucket, it corresponds to the number of tokens in the storage volume burst rate bucket.

In response to the I/O read/write operation for each storage volume, the current I/O read/write time at which the current I/O read/write operation occurs is obtained, the time difference between the current I/O read/write time and the previous I/O read/write time is calculated according to the current I/O read/write time and the previous I/O read/write time, and then the capacity of the storage volume burst rate bucket is updated according to the time difference and the preset token inflow burst bucket rate, where the capacity of the storage volume burst rate bucket is a product of the time difference and the preset token inflow burst bucket rate. By calculating the time difference between the current I/O read/write time and the previous I/O read/write time, the capacity of the storage volume burst rate bucket can be updated quickly and effectively according to the relationship between the time difference and the preset token inflow burst bucket rate.

Referring to FIG. 3, FIG. 3 shows a schematic diagram of a processing procedure of a token bucket and a dual timer provided by some embodiments of the present disclosure. When the I/O read/write operation occurs, the current I/O read/write time at which the current I/O read/write operation occurs is recorded, and the time difference between the current I/O read/write time and the previous I/O read/write time is calculated. Assuming that the capacity of the storage volume burst rate bucket is cvsb, the preset token inflow burst bucket rate is svsb, where svsb is a limit size of the burst IOPS of the storage volume, and the preset token inflow burst bucket rate svsb is greater than the above preset token inflow primary bucket rate svm, and thus the capacity of the storage volume burst rate bucket can be obtained and updated according to the relationship among the time difference, the preset token inflow burst bucket rate and the capacity of the storage volume burst rate bucket. For example, the capacity cvsb of the storage volume burst rate bucket is the product of the time difference t and the preset token inflow burst bucket rate svsb, that is, cvsb=svsb*t.

It is worth mentioning that assuming that the capacity of the storage volume burst capacity bucket is cvcb, the capacity cvcb of the storage volume burst capacity bucket is the product of the time difference t and the preset token inflow burst bucket rate svsb, that is, cvcb=svsb*t.

In some embodiments, the storage volume burst capacity bucket is provided with a bucket capacity recovery timer, and the method can further include:
  in response to consuming a number of tokens in the storage volume primary bucket due to the I/O quantity of the I/O read/write operation being less than or equal to the capacity of the storage volume primary bucket, if the bucket capacity recovery timer of the storage volume burst capacity bucket is not started, starting the bucket capacity recovery timer; and
  in response to a burst time interval of I/O bursts reaching a preset burst interval duration, updating a capacity state of the storage volume burst capacity bucket to a full bucket state, and stopping using the bucket capacity recovery timer.

For the bucket capacity recovery timer, it can be used for timing. For example, when a burst time interval of I/O bursts reaches a preset burst interval duration, the capacity state of the storage volume burst capacity bucket is updated to a full bucket state, that is, the bucket capacity recovery timer is used to control a maximum burst capacity allowed to recover the burst capacity bucket in a unit time after the I/O burst ends, and the burst I/O processed before restoring the maximum burst capacity of the burst capacity bucket can only use current remaining tokens in the burst capacity bucket to support a maximum burst duration under the maximum burst I/O condition.

Referring to FIG. 3, FIG. 3 shows a schematic diagram of a processing procedure of a token bucket and a dual timer provided by some embodiments of the present disclosure. When a number of tokens in the storage volume primary bucket is consumed due to the I/O quantity of the I/O read/write operation being less than or equal to the capacity of the storage volume primary bucket, if the bucket capacity recovery timer of the storage volume burst capacity bucket is not started, the bucket capacity recovery timer is started; when a burst time interval of I/O bursts reaches a preset burst interval duration, a capacity state of the storage volume burst capacity bucket is updated to a full bucket state using the bucket capacity recovery timer, and the bucket capacity recovery timer is stopped. By controlling the capacity state of the storage volume burst capacity bucket using the bucket capacity recovery timer of the storage volume burst capacity bucket, the maximum burst duration of the storage volume can be supported under the maximum burst I/O condition.

In some embodiments, the storage volume burst capacity bucket is provided with a bucket capacity emptying timer, and the method can further include:
  in response to consuming a number of tokens in the storage volume burst capacity bucket and a number of tokens in the storage volume burst rate bucket due to the I/O quantity of the I/O read/write operation being greater than the capacity of the storage volume primary bucket and less than the capacity of the storage volume burst capacity bucket and the capacity of the storage volume burst rate bucket, if the bucket capacity emptying timer of the storage volume burst capacity bucket is not started, starting the bucket capacity emptying timer; and
  in response to a burst duration of I/O burst reaching a preset burst duration, updating a capacity state of the storage volume burst capacity bucket to an empty bucket state, and stopping using the bucket capacity emptying timer.

For the bucket capacity emptying timer, it can be used for timing. For example, when a burst duration of I/O burst reaches a preset burst duration, the capacity state of the storage volume burst capacity bucket is updated to an empty bucket state, that is, the bucket capacity emptying timer is used to control that when the burst duration of burst I/O reaches the preset burst duration, no more bursts are allowed, and if the storage volume burst capacity bucket is in the empty bucket state, tokens cannot be obtained, and I/O bursts cannot be carried out, in this way, the continuous burst duration of the burst I/O can be controlled.

For the capacity of the storage volume burst rate bucket, it corresponds to the number of tokens in the storage volume burst rate bucket.

Referring to FIG. 3, FIG. 3 shows a schematic diagram of a processing procedure of a token bucket and a dual timer provided by some embodiments of the present disclosure. When a number of tokens in the storage volume burst capacity bucket and a number of tokens in the storage volume burst rate bucket are consumed due to the I/O quantity of the I/O read/write operation being greater than the capacity of the storage volume primary bucket and less than the capacity of the storage volume burst capacity bucket and the capacity of the storage volume burst rate bucket, if the bucket capacity emptying timer of the storage volume burst capacity bucket is not started, the bucket capacity emptying timer is started; when a burst duration of I/O burst reaches a preset burst duration, a capacity state of the storage volume burst capacity bucket is updated to an empty bucket state, and the bucket capacity emptying timer is stopped. By controlling the capacity state of the storage volume burst capacity bucket using the bucket capacity emptying timer of the storage volume burst capacity bucket, the continuous burst duration of burst I/O can be controlled.

In some embodiments, determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket in step 103 includes:
  in response to the I/O quantity of the I/O read/write operation being less than or equal to the capacity of the storage volume primary bucket, consuming a number of tokens in the storage volume primary bucket, wherein the number of tokens consumed in the storage volume primary bucket is the same as the I/O quantity of the I/O read/write operation; and
  in response to the number of tokens consumed in the storage volume primary bucket being equal to the I/O quantity and a number of tokens in the storage volume burst capacity bucket and a number of tokens in the storage volume burst rate bucket remaining unchanged, determining that the state of I/O in the I/O read/write operation is normal I/O.

For the I/O quantity, it refers to an I/O quantity corresponding to the I/O read/write operation. For the state of I/O, it can reflect a state corresponding to IOPS. For the normal I/O, it refers to I/O that can perform a normal read/write operation. For example, if the IOPS received or sent by a storage device or an application program remains relatively stable or constant for a period of time, it is the normal I/O and can perform a normal read/write operation.

When the I/O quantity of the I/O read/write operation is less than or equal to the capacity of the storage volume primary bucket, a number of tokens in the storage volume primary bucket is consumed, where the number of tokens consumed in the storage volume primary bucket is the same as the I/O quantity of the I/O read/write operation; and when the number of tokens consumed in the storage volume primary bucket is equal to the I/O quantity and a number of tokens in the storage volume burst capacity bucket and a number of tokens in the storage volume burst rate bucket remain unchanged, it is determined that the state of I/O in the I/O read/write operation is normal I/O. By determining the state of I/O in the I/O read/write operation as the normal I/O, targeted processing can be performed on the normal I/O, and a better processing policy of the normal I/O can be formulated to cope with I/O storms.

In some embodiments, determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket in step 103 includes:

in response to the I/O quantity of the I/O read/write operation being greater than the capacity of the storage volume primary bucket and less than the capacity of the storage volume burst capacity bucket and the capacity of the storage volume burst rate bucket, consuming a number of tokens in the storage volume burst capacity bucket and a number of tokens in the storage volume burst rate bucket, wherein the number of tokens consumed in the storage volume burst capacity bucket and the number of tokens consumed in the storage volume burst rate bucket are both the same as the I/O quantity of the I/O read/write operation; and in response to the number of tokens consumed in the storage volume burst capacity bucket and the number of tokens consumed in the storage volume burst rate bucket being both equal to the I/O quantity and a number of tokens in the storage volume primary bucket remaining unchanged, determining that the state of I/O in the I/O read/write operation is burst I/O.

For the burst I/O, it refers to burst I/O that can perform a normal read/write operation. For example, if the IOPS per unit time suddenly increases and is within the burst limit, it is the burst I/O and can perform a normal read/write operation.

When the I/O quantity of the I/O read/write operation is greater than the capacity of the storage volume primary bucket and less than the capacity of the storage volume burst capacity bucket and the capacity of the storage volume burst rate bucket, a number of tokens in the storage volume burst capacity bucket and a number of tokens in the storage volume burst rate bucket are consumed, where the number of tokens consumed in the storage volume burst capacity bucket and the number of tokens consumed in the storage volume burst rate bucket are both the same as the I/O quantity of the I/O read/write operation; and when the number of tokens consumed in the storage volume burst capacity bucket and the number of tokens consumed in the storage volume burst rate bucket are both equal to the I/O quantity and a number of tokens in the storage volume primary bucket remains unchanged, it is determined that the state of I/O in the I/O read/write operation is burst I/O. By determining the state of I/O in the I/O read/write operation as the burst I/O, targeted processing can be performed on the burst I/O, and a better processing policy of the burst I/O can be formulated to cope with I/O storms.

In some embodiments, determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket in step 103 includes:

in response to the I/O quantity of the I/O read/write operation being greater than the capacity of the storage volume primary bucket, the capacity of the storage volume burst capacity bucket and the capacity of the storage volume burst rate bucket, determining that a condition for performing a read/write operation on the I/O is not met; and in response to a number of tokens consumed in the storage volume primary bucket, a number of tokens consumed in the storage volume burst capacity bucket and a number of tokens consumed in the storage volume burst rate bucket being all zero, remaining a number of tokens in the storage volume primary bucket, a number of tokens in the storage volume burst capacity bucket and a number of tokens in the storage volume burst rate bucket unchanged, and determining that the state of I/O in the I/O read/write operation is I/O exceeding a burst limit.

The condition for the read/write operation is that the number of tokens in the token bucket needs to be greater than or equal to the I/O quantity of the I/O read/write operation.

For the I/O exceeding the burst limit, it refers to I/O that needs to be split and cannot perform a normal read/write operation. For example, if the IOPS per unit time suddenly increases and exceeds the burst limit, it is the I/O exceeding the burst limit, and the I/O exceeding the burst limit needs to be split and re-queued until a normal read/write operation can be performed.

If the I/O quantity of the I/O read/write operation is greater than the capacity of the storage volume primary bucket, the capacity of the storage volume burst capacity bucket and the capacity of the storage volume burst rate bucket, it is determined that a condition for performing a read/write operation on the I/O is not met; and when a number of tokens consumed in the storage volume primary bucket, a number of tokens consumed in the storage volume burst capacity bucket and a number of tokens consumed in the storage volume burst rate bucket are all zero, remaining a number of tokens in the storage volume primary bucket, a number of tokens in the storage volume burst capacity bucket and a number of tokens in the storage volume burst rate bucket unchanged, and determining that the state of I/O in the I/O read/write operation is I/O exceeding a burst limit. By determining the state of I/O in the I/O read/write operation as the I/O exceeding the burst limit, targeted processing can be performed on the I/O exceeding the burst limit, and a better processing policy of the I/O exceeding the burst limit can be formulated to cope with I/O storms.

In some embodiments, performing corresponding processing on the I/O according to the state of the I/O in step 104 includes:

in response to the state of the I/O in the I/O read/write operation being normal I/O, performing a normal read/write operation on the normal I/O;

in response to the state of the I/O in the I/O read/write operation being burst I/O, performing a normal read/write operation on the burst I/O; and in response to the state of the I/O in the I/O read/write operation being I/O exceeding a burst limit, splitting the I/O exceeding the burst limit.

For the normal I/O, it refers to I/O that can perform a normal read/write operation. For example, if the IOPS received or sent by a storage device or an application program remains relatively stable or constant for a period of time, it is the normal I/O and can perform a normal read/write operation. For the burst I/O, it refers to I/O that can perform a normal read/write operation. For example, if the IOPS per unit time suddenly increases and is within the burst limit, it is the burst I/O and can perform a normal read/write operation. For the I/O exceeding the burst limit, it refers to I/O that needs to be split and cannot perform a normal read/write operation. For example, if the IOPS per unit time suddenly increases and exceeds the burst limit, it is the I/O exceeding the burst limit, and the I/O exceeding the burst limit needs to be split and re-queued until a normal read/write operation can be performed.

When the state of the I/O in the I/O read/write operation is normal I/O, a normal read/write operation is performed on the normal I/O; when the state of the I/O in the I/O read/write operation is burst I/O, a normal read/write operation is performed on the burst I/O; and when the state of the I/O in the I/O read/write operation is I/O exceeding a burst limit, the I/O exceeding the burst limit is split. By determining the state of I/O in the I/O read/write operation, targeted processing can be performed on the normal I/O, the burst I/O and the I/O exceeding the burst limit, and better processing policies can be formulated for I/O in different states, so that the storage volume can meet the burst throughput requirements of I/O storm scenarios. Further, the flow limiting can be performed on the storage volume, and it is ensured that the storage volumes are isolated from each other and do not affect each other.

In some embodiments, I/O in different states is marked with specified colors respectively, wherein the normal I/O is marked in green, the burst I/O is marked in yellow, and the I/O exceeding the burst limit is marked in red.

The normal I/O is marked in green, the burst I/O is marked in yellow, and the I/O exceeding the burst limit is marked in red. By marking I/O in different states with corresponding colors, the state of the I/O in the I/O read/write operation can be quickly distinguished, thereby improving the processing efficiency of I/O.

It should be noted that a person skilled in the art can adjust the colors according to actual needs, or use other marking methods, which will not be limited here.

In some embodiments, after in response to the state of the I/O in the I/O read/write operation being I/O exceeding the burst limit, splitting the I/O exceeding the burst limit, the method further includes:
  obtaining new I/O after splitting the I/O exceeding the burst limit; and
  taking the new I/O as the I/O, and returning to the step of in response to the I/O read/write operation for each of the storage volumes, recording the current I/O read/write time and the I/O quantity of the I/O read/write operation.

After the I/O exceeding the burst limit is split, new I/O is obtained. The new I/O needs to be re-queued and waited, and thus the new I/O is taken as I/O, and it is necessary to return to the step of in response to the I/O read/write operation for each of the storage volumes, recording the current I/O read/write time and the I/O quantity of the I/O read/write operation; further, the above steps are repeated to obtain a new state of I/O, the read/write operation is performed on the new I/O, or the new I/O is split until the split new I/O can perform a normal read/write operation. By splitting the I/O exceeding the burst limit, and returning I/O generated after splitting to step 101, the storage volume can meet the burst throughput requirements of I/O storm scenarios. Further, the flow limiting can be performed on the storage volume, and it is ensured that the storage volumes are isolated from each other and do not affect each other.

In order to make a person skilled in the art better understand the technical solutions in some embodiments of the present disclosure, the following is an exemplary explanation through an example.

Figure 4:
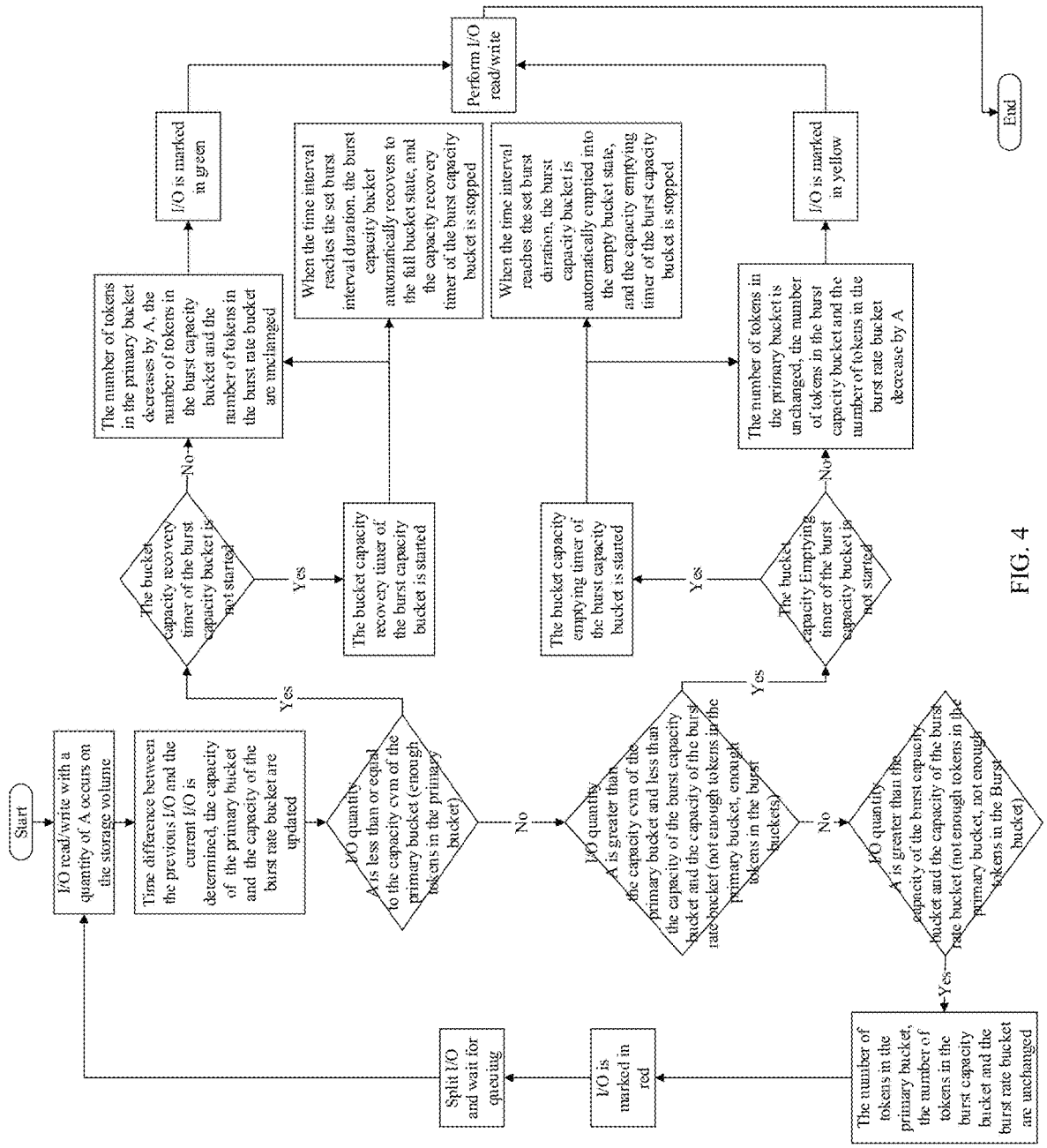
FIG. 4 is a flowchart of an I/O processing of a storage volume provided by some embodiments of the present disclosure.

Referring to FIG. 4, FIG. 4 shows a flowchart of an I/O processing of a storage volume provided by some embodiments of the present disclosure. The following can be seen from FIG. 4.

S1, I/O read/write operations with a quantity of A (assumed value) occur on a storage volume, and a current I/O read/write time and an I/O quantity of each of the I/O read/write operations are recorded.

S2, a time difference between the current I/O read/write time and a previous I/O read/write time is calculated, and a capacity of a storage volume primary bucket and a capacity of a storage volume burst rate bucket are updated according to the time difference and a preset token inflow bucket rate.

S3, when a number of tokens in the storage volume primary bucket is consumed due to the I/O quantity A of the I/O read/write operations being less than or equal to the capacity of the storage volume primary bucket, if a bucket capacity recovery timer of a storage volume burst capacity bucket is not started, the bucket capacity recovery timer is started; and when a burst time interval of I/O bursts reaches a preset burst interval duration, a capacity state of the storage volume burst capacity bucket is updated to a full bucket state, and the bucket capacity recovery timer is stopped.

The number of tokens in the storage volume primary bucket decreases by A, while a number of tokens in the storage volume burst capacity bucket and a number of tokens in the storage volume burst rate bucket remain unchanged; at this time, it is determined that a state of I/O in the I/O read/write operations is normal I/O, and it is marked in green; further, a normal read/write operation is performed on the normal I/O, and the process is ended.

S4, when a number of tokens in the storage volume burst capacity bucket and a number of tokens in the storage volume burst rate bucket are consumed due to the I/O quantity A of the I/O read/write operations being greater than the capacity of the storage volume primary bucket and less than the capacity of the storage volume burst capacity bucket and the capacity of the storage volume burst rate bucket, if the bucket capacity emptying timer of the storage volume burst capacity bucket is not started, the bucket capacity emptying timer is started; and when a burst duration of I/O burst reaches a preset burst duration, a capacity state of the storage volume burst capacity bucket is updated to an empty bucket state, and the bucket capacity emptying timer is stopped.

The number of tokens in the storage volume burst capacity bucket and the number of tokens in the storage volume burst rate bucket decrease by A, while number of tokens in the storage volume primary bucket remains unchanged; at this time, it is determined that the state of I/O in the I/O read/write operations is burst I/O, and it is marked in yellow; further, the normal read/write operation is performed on the burst I/O, and the process is ended.

S5, if the I/O quantity A of the I/O read/write operations is greater than the capacity of the storage volume primary bucket, the capacity of the storage volume burst capacity bucket and the capacity of the storage volume burst rate bucket, a normal read/write operation cannot be performed.

When the number of tokens in the storage volume primary bucket, the number of tokens in the storage volume burst capacity bucket and the number of tokens in the storage volume burst rate bucket remain unchanged, it is determined that the state of I/O in the I/O read/write operations is I/O exceeding the burst limit, and it is marked in red. The normal I/O read/write operation cannot be performed on the I/O exceeding the burst limit, the I/O exceeding the burst limit needs to be split, re-queued and waited. Return to step S1 until the normal I/O read/write operation can be performed on the split new I/O, and then end the process of I/O read/write operations.

It should be noted that for the method embodiments, in order to provide a concise description, the method embodiments are all expressed as a series of action combinations. However, a person skilled in the art should know that the embodiments of the present disclosure are not limited by the described sequence of actions as some steps can be executed in another sequence or simultaneously according to the embodiments of the present disclosure. Secondly, a person skilled in the art should also know that the embodiments described in the specification are all example embodiments, and the involved actions are not necessarily required by the embodiments of the present disclosure.

Figure 5:
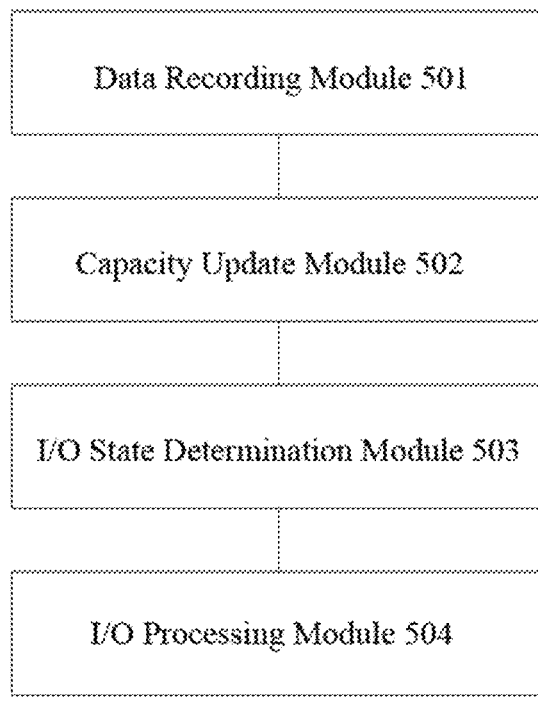
FIG. 5 is a structural block diagram of an apparatus for supporting an input/output operations per second (IOPS) burst provided by some embodiments of the present disclosure.

Referring to FIG. 5, FIG. 5 shows a structural block diagram of an apparatus for supporting an input/output operations per second (IOPS) burst provided by some embodiments of the present disclosure. The apparatus is applied to a storage cluster including one or more storage volumes and a token bucket, wherein the token bucket includes a plurality of tokens, and the token bucket includes a storage volume primary bucket, a storage volume burst capacity bucket and a storage volume burst rate bucket, wherein the storage volume primary bucket is used to control a maximum IOPS of the storage volumes, the storage volume burst capacity bucket is used to control an IOPS burst duration of the storage volumes, and the storage volume burst rate bucket is used to control an IOPS burst rate of the storage volumes, the apparatus can include following modules:

- a data recording module 501 configured to in response to an input/output (I/O) read/write operation for each of the storage volumes, record a current I/O read/write time and an I/O quantity of the I/O read/write operation;
- a capacity update module 502 configured to calculate a time difference between the current I/O read/write time and a previous I/O read/write time, and update a capacity of the storage volume primary bucket and a capacity of the storage volume burst rate bucket according to the time difference and a preset token inflow bucket rate;
- an I/O state determination module 503 configured to determine a state of I/O in the I/O read/write operation according to the I/O quantity and a size relationship among an updated capacity of the storage volume primary bucket, an updated capacity of the storage volume burst rate bucket and a capacity of the storage volume burst capacity bucket, wherein the state of the I/O is used to reflect a state of IOPS; and
- an I/O processing module 504 configured to perform corresponding processing on the I/O according to the state of the I/O.

In some embodiments, the preset token inflow bucket rate includes a preset token inflow primary bucket rate, and the capacity update module 502 is configured to:

- in response to the I/O read/write operation for the storage volume, obtain the current I/O read/write time of the I/O read/write operation;
- calculate the time difference between the current I/O read/write time and the previous I/O read/write time according to the current I/O read/write time and the previous I/O read/write time; and
- update the capacity of the storage volume primary bucket according to the time difference and the preset token inflow primary bucket rate, wherein the capacity of the storage volume primary bucket is a product of the time difference and the preset token inflow primary bucket rate.

In some embodiments, the preset token inflow bucket rate includes a preset token inflow burst bucket rate, and the capacity update module 502 is configured to:

- in response to the I/O read/write operation for the storage volume, obtain the current I/O read/write time of the I/O read/write operation;
- calculate the time difference between the current I/O read/write time and the previous I/O read/write time according to the current I/O read/write time and the previous I/O read/write time; and
- update the capacity of the storage volume burst rate bucket according to the time difference and the preset token inflow burst bucket rate, wherein the capacity of the storage volume burst rate bucket is a product of the time difference and the preset token inflow burst bucket rate.

In some embodiments, the I/O state determination module 503 is configured to:

- in response to the I/O quantity of the I/O read/write operation being less than or equal to the capacity of the storage volume primary bucket, consume a number of tokens in the storage volume primary bucket, wherein the number of tokens consumed in the storage volume primary bucket is the same as the I/O quantity of the I/O read/write operation; and
- in response to the number of tokens consumed in the storage volume primary bucket being equal to the I/O quantity and a number of tokens in the storage volume burst capacity bucket and a number of tokens in the storage volume burst rate bucket remaining unchanged, determine that the state of I/O in the I/O read/write operation is normal I/O.

In some embodiments, the I/O state determination module 503 is configured to:

- in response to the I/O quantity of the I/O read/write operation being greater than the capacity of the storage volume primary bucket and less than the capacity of the storage volume burst capacity bucket and the capacity of the storage volume burst rate bucket, consume a number of tokens in the storage volume burst capacity bucket and a number of tokens in the storage volume burst rate bucket, wherein the number of tokens consumed in the storage volume burst capacity bucket and the number of tokens consumed in the storage volume burst rate bucket are both the same as the I/O quantity of the I/O read/write operation; and
- in response to the number of tokens consumed in the storage volume burst capacity bucket and the number of tokens consumed in the storage volume burst rate bucket being both equal to the I/O quantity and a number of tokens in the storage volume primary bucket remaining unchanged, determine that the state of I/O in the I/O read/write operation is burst I/O.

In some embodiments, the I/O state determination module 503 is configured to:

in response to the I/O quantity of the I/O read/write operation being greater than the capacity of the storage volume primary bucket, the capacity of the storage volume burst capacity bucket and the capacity of the storage volume burst rate bucket, determine that a condition for performing a read/write operation on the I/O is not met; and in response to a number of tokens consumed in the storage volume primary bucket, a number of tokens consumed in the storage volume burst capacity bucket and a number of tokens consumed in the storage volume burst rate bucket being all zero, remain a number of tokens in the storage volume primary bucket, a number of tokens in the storage volume burst capacity bucket and a number of tokens in the storage volume burst rate bucket unchanged, and determine that the state of I/O in the I/O read/write operation is I/O exceeding a burst limit.

In some embodiments, the I/O processing module 504 is configured to:

in response to the state of the I/O in the I/O read/write operation being normal I/O, perform a normal read/write operation on the normal I/O;

in response to the state of the I/O in the I/O read/write operation being burst I/O, perform a normal read/write operation on the burst I/O; and in response to the state of the I/O in the I/O read/write operation being I/O exceeding a burst limit, split the I/O exceeding the burst limit.

For apparatus embodiments, since the apparatus embodiments are basically similar to the method embodiments, the description thereof is relatively simple. For related parts, refer to partial descriptions in the method embodiments.

In addition, some embodiments of the present disclosure further provide an electronic device including a processor, a memory, and a computer program stored in the memory and capable of running on the processor; when executed by the processor, the computer program can realize each process of the embodiments of the above method for supporting the IOPS burst, and can realize the same technical effects. To avoid repetition, it will not be repeated here.

Figure 6:
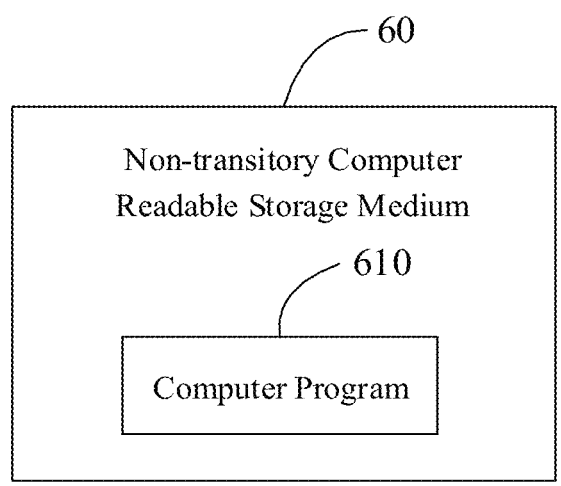
FIG. 6 is a schematic structural diagram of a non-transitory computer readable storage medium provided by some embodiments of the present disclosure.

FIG. 6 is a schematic structural diagram of a non-transitory computer readable storage medium provided by some embodiments of the present disclosure.

Some embodiments of the present disclosure further disclose a non-transitory computer readable storage medium 60 having a computer program 610 stored thereon, when executed by a processor, the computer program 610 can realize each process of the embodiments of the above method for supporting the IOPS burst, and can realize the same technical effects. To avoid repetition, it will not be repeated here. The non-transitory computer readable storage medium 60 can be a read-only memory (ROM), a random access memory (RAM), a magnetic disk or an optical disk.

Figure 7:
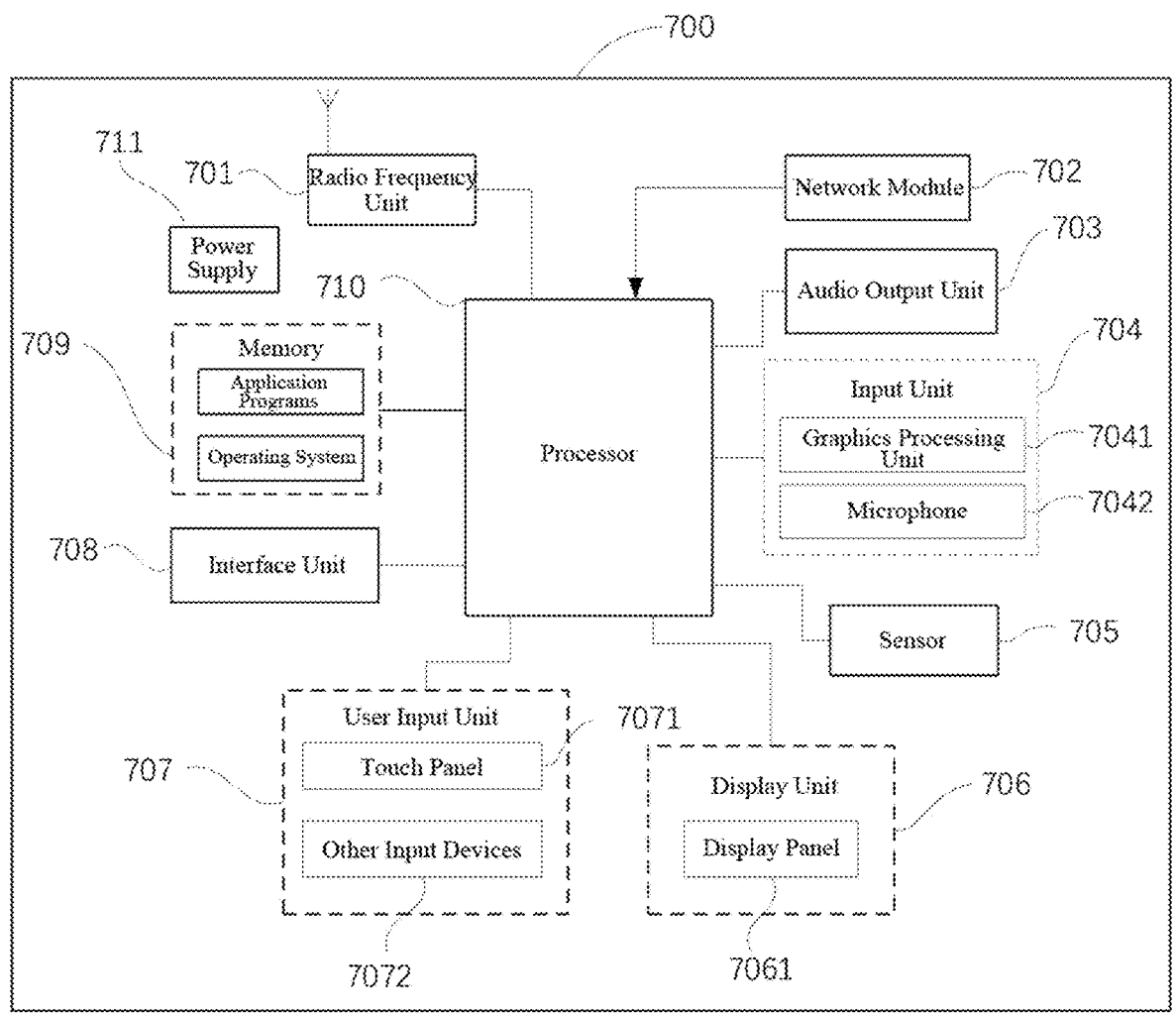
FIG. 7 is a schematic structural diagram of hardware of an electronic device provided by some embodiments of the present disclosure.

FIG. 7 is a schematic structural diagram of hardware of an electronic device provided by some embodiments of the present disclosure.

The electronic device 700 includes, but is not limited to, a radio frequency unit 701, a network module 702, an audio output unit 703, an input unit 704, a sensor 705, a display unit 706, a user input unit 707, an interface unit 708, a memory 709, a processor 710, a power supply 711, and the like. A person skilled in the art can understand that the structure of the electronic device shown in FIG. 7 does not constitute a limitation on the electronic device. The electronic device can include more or less components than those shown in the figure, or combinations of certain components, or different component arrangements. In some embodiments of the present disclosure, the electronic device includes, but is not limited to, mobile phones, tablet computers, notebook computers, palmtop computers, in-vehicle terminals, wearable devices, pedometers, and the like.

It should be understood that in some embodiments of the present disclosure, the radio frequency unit 701 can be configured to receive and transmit signals in the process of sending and receiving information or talking. For example, downlink data from a base station is received and then processed by the processor 710, and in addition, uplink data is transmitted to the base station. In general, the radio frequency unit 701 includes, but is not limited to, an antenna, at least one amplifier, a transceiver, a coupler, a low noise amplifier, a duplexer, and the like. In addition, the radio frequency unit 701 can further communicate with a network and other devices through a wireless communication system.

The electronic device provides users with wireless broadband Internet access through the network module 702, for example, helping the users to send and receive emails, browse web pages, and access streaming media.

The audio output unit 703 can convert audio data received by the radio frequency unit 701 or the network module 702 or stored in the memory 709 into audio signals and output the audio signals as sounds. Moreover, the audio output unit 703 can further provide audio output related to a specific function executed by the electronic device 700 (for example, a call signal reception sound, a message reception sound, and the like). The audio output unit 703 includes a speaker, a buzzer, a receiver, and the like.

The input unit 704 is configured to receive audio or video signals. The input unit 704 can include a graphics processing unit (GPU) 7041 and a microphone 7042. The graphics processing unit 7041 processes still pictures or video image data obtained by an image capture device (for example, a camera) in a video capture mode or an image capture mode. Processed image frames can be displayed on the display unit 706. The image frames processed by the graphics processing unit 7041 can be stored in the memory 709 (or other storage media), or sent via the radio frequency unit 701 or the network module 702. The microphone 7042 can receive sounds, and can process such sounds into audio data. The processed audio data can be converted into a format that can be sent to a mobile communication base station via the radio frequency unit 701 for output in the case of a telephone call mode.

The electronic device 700 further includes one or more sensors 705, for example, a light sensor, a motion sensor, and other sensors. For example, the light sensor includes an ambient light sensor and a proximity sensor. The ambient light sensor can adjust the brightness of a display panel 7061 according to the brightness of ambient light. The proximity sensor can close the display panel 7061 and/or backlight when the electronic device 700 is moved to the ear. As a kind of motion sensor, an accelerometer sensor can detect the magnitude of acceleration in each direction (usually three axes), and can detect out the magnitude and direction of gravity when stationary, and can be used for posture (for example, landscape or portrait screen switching, related games, and magnetometer attitude calibration) recognition of the electronic device, vibration recognition related functions (for example, a pedometer and percussion), and the like. The sensor 705 can further include fingerprint sensors, pressure sensors, iris sensors, molecular sensors, gyroscopes, barometers, hygrometers, thermometers, infrared sensors, and the like, which will not be repeated here.

The display unit 706 is configured to display information input by users or information provided to the users. The display unit 706 can include the display panel 7061, and the display panel 7061 can be configured in the form of a liquid crystal display (LCD), an organic light-emitting diode (OLED), and the like.

The user input unit 707 can be configured to receive input number or character information, and generate key signal input related to user configuration and function control of the electronic device. Specifically, the user input unit 707 includes a touch panel 7071 and other input devices 7072. The touch panel 7071, also referred to as a touch screen, can collect a touch operation of the user on or near the touch panel 7071 (for example, an operation made by the user using any suitable objects or accessories such as fingers and a touch pen on the touch panel 7071 or near the touch panel 7071). The touch panel 7071 can include two parts: a touch detection apparatus and a touch controller. The touch detection apparatus detects the user's touch position, detects a signal brought by the touch operation, and transmits the signal to the touch controller. The touch controller receives touch information from the touch detection apparatus, converts the touch information into contact coordinates, then sends the contact coordinates to the processor 710, and receives and executes a command sent by the processor 710. In addition, the touch panel 7071 can be implemented in various types such as resistive, capacitive, infrared, and surface acoustic wave. In addition to the touch panel 7071, the user input unit 707 can further include other input devices 7072. Specifically, the other input devices 7072 can include, but are not limited to, a physical keyboard, function keys (for example, volume control buttons and switch buttons), a trackball, a mouse, and a joystick, which will not be repeated here.

Further, the touch panel 7071 can cover the display panel 7061. When detecting out the touch operation on or near the touch panel 7071, the touch panel 7071 transmits the touch operation to the processor 710 to determine a type of a touch event, and then the processor 710 provides corresponding visual output on the display panel 7061 according to the type of the touch event. In FIG. 7, although the touch panel 7071 and the display panel 7061 are used as two independent components to realize input and output functions of the electronic device, in some embodiments, the touch panel 7071 and the display panel 7061 can be integrated to realize the input and output functions of the electronic device, which is not specifically limited here.

The interface unit 708 is an interface for connecting an external device with the electronic device 700. For example, the external device can include a wired or wireless headset port, an external power supply (or a battery charger) port, a wired or wireless data port, a memory card port, a port for connecting a device with an identification module, an audio input/output (I/O) port, a video I/O port, a headphone port, and the like. The interface unit 708 can be configured to receive input (for example, data information, power, and the like) from the external device and transmit the received input to one or more elements in the electronic device 700, or can be configured to transmit data between the electronic device 700 and the external device.

The memory 709 can be configured to store software programs and various data. The memory 709 can mainly include a program storage region and a data storage region. The program storage region can store an operating system, application programs required for at least one function (for example, a sound playback function and an image playback function), and the like. The data storage region can store data (for example, audio data and a phone book) created according to use of mobile phones, and the like. In addition, the memory 709 can include a high-speed random access memory, and can further include a non-volatile memory, for example, at least one magnetic disk storage device, a flash memory device, or other volatile solid-state storage devices.

The processor 710 is a control center of the electronic device, connects various parts of the entire electronic device by using various interfaces and lines, and executes various functions of the electronic device and processes data by running or executing software programs and/or modules stored in the memory 709, and calling the data stored in the memory 709, so as to monitor the electronic device as a whole. The processor 710 can include one or more processing units. Preferably, the processor 710 can integrate an application processor and a modem processor. The application processor mainly processes the operating system, a user interface, the application programs, and the like. The modem processor mainly processes wireless communications. It can be understood that the modem processor can also not be integrated into the processor 710.

The electronic device 700 can further include the power supply 711 (for example, a battery) for supplying power to various components. Preferably, the power supply 711 can be logically connected to the processor 710 through a power management system, so charging management, discharging management, power consumption management and other functions are realized through the power management system.

In addition, the electronic device 700 includes some functional modules not shown, which will not be repeated here.

It should be noted that in the specification, terms "include", "comprise", or any variants thereof are intended to cover a non-exclusive inclusion, so that a process, a method, an object, or an apparatus that includes a series of elements not only includes those elements, but also includes other elements that are not expressly listed, or further includes elements inherent to such process, method, object, or apparatus. In absence of more constraints, an element preceded by "includes a/an . . . " does not preclude existence of other identical elements in the process, method, object, or apparatus that includes the element.

Based on the foregoing descriptions of the implementations, a person skilled in the art can clearly understand that the methods in the foregoing embodiments can be implemented by using software in combination with a necessary common hardware platform, and certainly can alternatively be implemented by using hardware. However, in most cases, the former is a preferred implementation. Based on such an understanding, the technical solutions of the present disclosure essentially or the part contributing to the related art can be implemented in a form of a software product. The software product is stored in a storage medium (for example, a ROM/RAM, a magnetic disk, or an optical disc), and includes several instructions for indicating a terminal (which can be a mobile phone, a computer, a server, an air conditioner, a network device, or the like) to perform the methods described in the embodiments of the present disclosure.

The foregoing describes the embodiments of the present disclosure with reference to the accompanying drawings. However, the present disclosure is not limited to the foregoing specific embodiments. The foregoing specific embodiments are merely illustrative rather than restrictive. As instructed by the present disclosure, a person of ordinary skill in the art can develop many other manners without departing from principles of the present disclosure and the protection scope of the claims, and all such manners fall within the protection scope of the present disclosure.

A person of ordinary skill in the art can be aware that, the units and algorithm steps of the examples described with reference to the embodiments disclosed in this specification can be implemented in electronic hardware, or a combination of computer software and electronic hardware. Whether the functions are executed by hardware or software depends on particular applications and design constraint conditions of the technical solutions. A person skilled in the art can use different methods to implement the described functions for each of the particular applications, but it is not to be considered that the implementation goes beyond the scope of the present disclosure.

A person skilled in the art can clearly understand that for the purpose of convenient and brief description, for specific working processes of the foregoing described system, apparatus, and unit, reference can be made to the corresponding processes in the foregoing method embodiments, and details are not described herein again.

In the embodiments provided by the present disclosure, it should be understood that the disclosed apparatus and method can be implemented in other manners. For example, the described apparatus embodiment is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electric, mechanical, or other forms.

The units described as separate components may or may not be physically separated. The components displayed as units may or may not be physical units, that is, can be located in one place or can be distributed on a plurality of network units. Some or all of the units can be selected according to actual needs to achieve the objectives of the solutions of the embodiments of the present disclosure.

In addition, functional units in the embodiments of the present disclosure can be integrated into one processing unit, or each of the units can be physically separated, or two or more units can be integrated into one unit.

If implemented in the form of software functional units and sold or used as an independent product, the functions can also be stored in a computer-readable storage medium. Based on such an understanding, the technical solutions of the present disclosure essentially, or the part contributing to the related art, or the part of the technical solution, can be implemented in a form of a software product. The computer software product is stored in a storage medium, and includes several instructions for instructing a computer device (which can be a personal computer, a server, a network device, or the like) to perform all or some of the steps of the method described in the embodiments of the present disclosure. The foregoing storage medium includes: any medium that can store program code, for example, a USB flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for supporting an input/output operations per second (IOPS) burst, applied to a storage cluster comprising one or more storage volumes and a token bucket, the method comprises:
   in response to an input/output (I/O) read/write operation for each of the storage volumes, recording a current I/O read/write time and an I/O quantity of the I/O read/write operation;
   calculating a time difference between the current I/O read/write time and a previous I/O read/write time, and updating a capacity of a storage volume primary bucket and a capacity of a storage volume burst rate bucket according to the time difference and a preset token inflow bucket rate, wherein the storage volume primary bucket is used to control a maximum IOPS of the storage volumes and the storage volume burst rate bucket is used to control an IOPS burst rate of the storage volumes;
   determining a state of I/O in the I/O read/write operation according to the I/O quantity and a size relationship among an updated capacity of the storage volume primary bucket, an updated capacity of the storage volume burst rate bucket and a capacity of a storage volume burst capacity bucket, wherein the storage volume burst capacity bucket is used to control an IOPS burst duration of the storage volumes and the state of the I/O is used to reflect a state of IOPS; and
   performing the I/O read/write operation according to the state of the I/O,
   wherein the token bucket comprises a plurality of tokens, and the token bucket comprises the storage volume primary bucket, the storage volume burst rate bucket and the storage volume burst capacity bucket.

2. The method according to claim 1, wherein before in response to the input/output (I/O) read/write operation for each of the storage volumes, recording a current I/O read/write time and an I/O quantity of the I/O read/write operation, the method further comprises:
   obtaining a configuration and a scale of the storage cluster;
   obtaining a total I/O processing capacity of the storage cluster according to the configuration and the scale of the storage cluster, wherein the total I/O processing capacity of the storage cluster is represented by a number of tokens in the token bucket;
   creating a storage volume in the storage cluster in response to a number of tokens corresponding to the total I/O processing capacity of the storage cluster being greater than or equal to a preset token value required for creating the storage volume in the storage cluster; and
   prohibiting creating the storage volume in the storage cluster in response to the number of tokens corresponding to the total I/O processing capacity of the storage cluster being less than the preset token value required for creating the storage volume in the storage cluster.

3. The method according to claim 2, wherein the total I/O processing capacity of the storage cluster comprises a maximum IOPS processing capacity and a burst IOPS processing capacity, wherein a number of tokens corresponding to the maximum IOPS processing capacity and a number of tokens corresponding to the burst IOPS processing capacity are allocated by the total I/O processing capacity.

4. The method according to claim 2, further comprising:
in response to creating the storage volume in the storage cluster, setting a maximum IOPS and a burst IOPS of the storage volume, wherein the maximum IOPS and the burst IOPS of the storage volume correspond to a number of tokens that consume the maximum IOPS processing capacity and the burst IOPS processing capacity of the storage cluster.

5. The method according to claim 1, wherein a number of tokens in the token bucket represents a capacity of the token bucket, the capacity of the storage volume primary bucket corresponds to a number of tokens in the storage volume primary bucket, the capacity of the storage volume burst capacity bucket corresponds to a number of tokens in the storage volume burst capacity bucket, and the capacity of the storage volume burst rate bucket corresponds to a number of tokens in the storage volume burst rate bucket.

6. The method according to claim 1, wherein the preset token inflow bucket rate comprises a preset token inflow primary bucket rate, and calculating the time difference between the current I/O read/write time and the previous I/O read/write time, and updating the capacity of the storage volume primary bucket and the capacity of the storage volume burst rate bucket according to the time difference and the preset token inflow bucket rate comprises:
in response to the I/O read/write operation for the storage volume, obtaining the current I/O read/write time of the I/O read/write operation;
calculating the time difference between the current I/O read/write time and the previous I/O read/write time according to the current I/O read/write time and the previous I/O read/write time; and
updating the capacity of the storage volume primary bucket according to the time difference and the preset token inflow primary bucket rate, wherein the capacity of the storage volume primary bucket is a product of the time difference and the preset token inflow primary bucket rate.

7. The method according to claim 1, wherein the preset token inflow bucket rate comprises a preset token inflow burst bucket rate, and calculating the time difference between the current I/O read/write time and the previous I/O read/write time, and updating the capacity of the storage volume primary bucket and the capacity of the storage volume burst rate bucket according to the time difference and the preset token inflow bucket rate comprises:
in response to the I/O read/write operation for the storage volume, obtaining the current I/O read/write time of the I/O read/write operation;
calculating the time difference between the current I/O read/write time and the previous I/O read/write time according to the current I/O read/write time and the previous I/O read/write time; and
updating the capacity of the storage volume burst rate bucket according to the time difference and the preset token inflow burst bucket rate, wherein the capacity of the storage volume burst rate bucket is a product of the time difference and the preset token inflow burst bucket rate.

8. The method according to claim 1, wherein the storage volume burst capacity bucket is provided with a bucket capacity recovery timer, and the method further comprises:
in response to consuming a number of tokens in the storage volume primary bucket due to the I/O quantity of the I/O read/write operation being less than or equal to the capacity of the storage volume primary bucket, in a case that the bucket capacity recovery timer of the storage volume burst capacity bucket is not started, starting the bucket capacity recovery timer; and
in response to a burst time interval of I/O bursts reaching a preset burst interval duration, updating a capacity state of the storage volume burst capacity bucket to a full bucket state, and stopping using the bucket capacity recovery timer.

9. The method according to claim 1, wherein the storage volume burst capacity bucket is provided with a bucket capacity emptying timer, and the method further comprises:
in response to consuming a number of tokens in the storage volume burst capacity bucket and a number of tokens in the storage volume burst rate bucket due to the I/O quantity of the I/O read/write operation being greater than the capacity of the storage volume primary bucket and less than the capacity of the storage volume burst capacity bucket and the capacity of the storage volume burst rate bucket, in a case that the bucket capacity emptying timer of the storage volume burst capacity bucket is not started, starting the bucket capacity emptying timer; and
in response to a burst duration of I/O burst reaching a preset burst duration, updating a capacity state of the storage volume burst capacity bucket to an empty bucket state, and stopping using the bucket capacity emptying timer.

10. The method according to claim 1, further comprising:
in response to performing the I/O read/write operation on the storage volume, consuming one or more tokens in the token bucket, wherein a number of tokens consumed in the token bucket is the same as the I/O quantity of the I/O read/write operation.

11. The method according to claim 1, wherein determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket comprises:
in response to the I/O quantity of the I/O read/write operation being less than or equal to the capacity of the storage volume primary bucket, consuming a number of tokens in the storage volume primary bucket, wherein the number of tokens consumed in the storage volume primary bucket is the same as the I/O quantity of the I/O read/write operation; and
in response to the number of tokens consumed in the storage volume primary bucket being equal to the I/O quantity and a number of tokens in the storage volume burst capacity bucket and a number of tokens in the storage volume burst rate bucket remaining unchanged, determining that the state of I/O in the I/O read/write operation is normal I/O.

12. The method according to claim 1, wherein determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket comprises:
in response to the I/O quantity of the I/O read/write operation being greater than the capacity of the storage volume primary bucket and less than the capacity of the storage volume burst capacity bucket and the capacity of the storage volume burst rate bucket, consuming a number of tokens in the storage volume burst capacity bucket and a number of tokens in the storage volume burst rate bucket, wherein the number of tokens consumed in the storage volume burst capacity bucket and the number of tokens consumed in the storage volume burst rate bucket are both the same as the I/O quantity of the I/O read/write operation; and in response to the number of tokens consumed in the storage volume burst capacity bucket and the number of tokens consumed in the storage volume burst rate bucket being both equal to the I/O quantity and a number of tokens in the storage volume primary bucket remaining unchanged, determining that the state of I/O in the I/O read/write operation is burst I/O.

13. The method according to claim 1, wherein determining the state of I/O in the I/O read/write operation according to the I/O quantity and the size relationship among the updated capacity of the storage volume primary bucket, the updated capacity of the storage volume burst rate bucket and the capacity of the storage volume burst capacity bucket comprises:

in response to the I/O quantity of the I/O read/write operation being greater than the capacity of the storage volume primary bucket, the capacity of the storage volume burst capacity bucket and the capacity of the storage volume burst rate bucket, determining that a condition for performing a read/write operation on the I/O is not met; and in response to a number of tokens consumed in the storage volume primary bucket, a number of tokens consumed in the storage volume burst capacity bucket and a number of tokens consumed in the storage volume burst rate bucket being all zero, remaining a number of tokens in the storage volume primary bucket, a number of tokens in the storage volume burst capacity bucket and a number of tokens in the storage volume burst rate bucket unchanged, and determining that the state of I/O in the I/O read/write operation is I/O exceeding a burst limit.

14. The method according to claim 11, wherein performing the I/O read/write operation according to the state of the I/O comprises:

in response to the state of the I/O in the I/O read/write operation being the normal I/O, performing a normal read/write operation on the normal I/O.

15. The method according to claim 14, further comprising:

marking I/O in different states with specified colors respectively, wherein the normal I/O is marked in green, the burst I/O is marked in yellow, and the I/O exceeding the burst limit is marked in red.

16. An electronic device comprising a processor, a communication interface, a memory and a communication bus, wherein the processor, the communication interface and the memory communicate with each other through the communication bus;

the memory is configured to store computer programs; and the processor is configured to implement the method according to claim 1 when executing the computer programs stored in the memory.

17. A non-transitory computer readable storage medium storing instructions, wherein the instructions, when executed by one or more processors, cause the processors to perform the method according to claim 1.

18. The method according to claim 12, wherein performing the I/O read/write operation according to the state of the I/O comprises:

in response to the state of the I/O in the I/O read/write operation being the burst I/O, performing a normal read/write operation on the burst I/O.

19. The method according to claim 13, wherein performing the I/O read/write operation according to the state of the I/O comprises:

in response to the state of the I/O in the I/O read/write operation being the I/O exceeding a burst limit, splitting the I/O exceeding the burst limit.

20. The method according to claim 19, wherein after in response to the state of the I/O in the I/O read/write operation being I/O exceeding the burst limit, splitting the I/O exceeding the burst limit, the method further comprises:

obtaining new I/O after splitting the I/O exceeding the burst limit; and taking the new I/O as the I/O, and returning to the step of in response to the I/O read/write operation for each of the storage volumes, recording the current I/O read/write time and the I/O quantity of the I/O read/write operation.

* * * * *